United States Patent [19]

Batchelor et al.

[11] 4,080,230

[45] Mar. 21, 1978

[54] METHOD AND AUTOMATED SYSTEM FOR RETREADING TIRES

[75] Inventors: Kenneth W. Batchelor, Pleasanton; John W. Thacher, San Jose, both of Calif.

[73] Assignee: Rubber Machines, Systems Inc., Pleasanton, Calif.

[21] Appl. No.: 737,483

[22] Filed: Nov. 1, 1976

[51] Int. Cl.² ............................................ B29H 21/08
[52] U.S. Cl. .................................. 156/96; 83/5; 156/128 R; 156/268; 156/394; 156/526; 157/13
[58] Field of Search ................ 156/95, 96, 98, 154, 156/123, 126, 127–130, 268, 394, 405, 523, 526; 157/13; 83/5, 171; 30/140

[56] References Cited

U.S. PATENT DOCUMENTS

| | | | |
|---|---|---|---|
| 3,075,575 | 1/1963 | Orenduff | 157/13 |
| 3,455,764 | 7/1969 | Bryant | 156/128 |
| 3,472,714 | 10/1969 | Ragan | 156/96 |
| 3,502,131 | 3/1970 | Rawls | 157/13 |
| 3,623,531 | 11/1971 | Christie | 157/13 |
| 3,808,076 | 4/1974 | Barwell | 156/96 |
| 3,850,222 | 11/1974 | Lejeune | 157/13 |
| 3,999,589 | 12/1976 | Meacheam | 157/13 |

*Primary Examiner*—William A. Powell
*Assistant Examiner*—John E. Kittle
*Attorney, Agent, or Firm*—Alvin E. Hendricson

[57] ABSTRACT

A method and system for applying at least one thick sheet of uncured rubber as a layer about the periphery of a buffed tire carcass and "sticking" the layer thereto by pressure applied from the crown of the tire outward as the tire is rotated. A tread design is formed in the rubber layer by at least one heated cutter which is prealigned with the tire carcass and is limited to impovement along a predetermined path for each of a plurality of angularly indexed tire positions. After tread formation the layer is vulcanized onto the tire carcass by the application of heat and pressure and the rubber cut from the layer is reused in forming a sheet of rubber for another tire tread.

8 Claims, 20 Drawing Figures

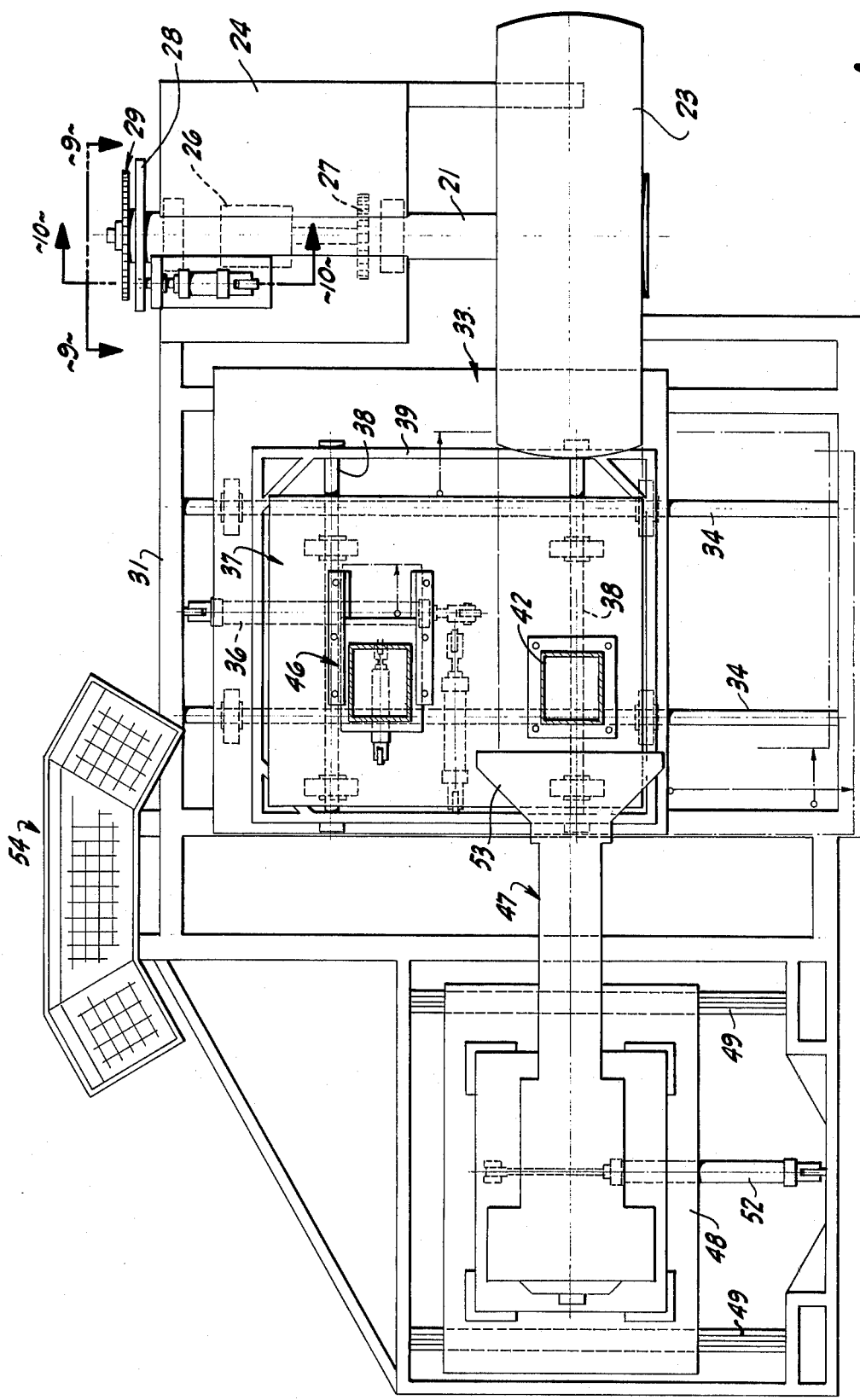

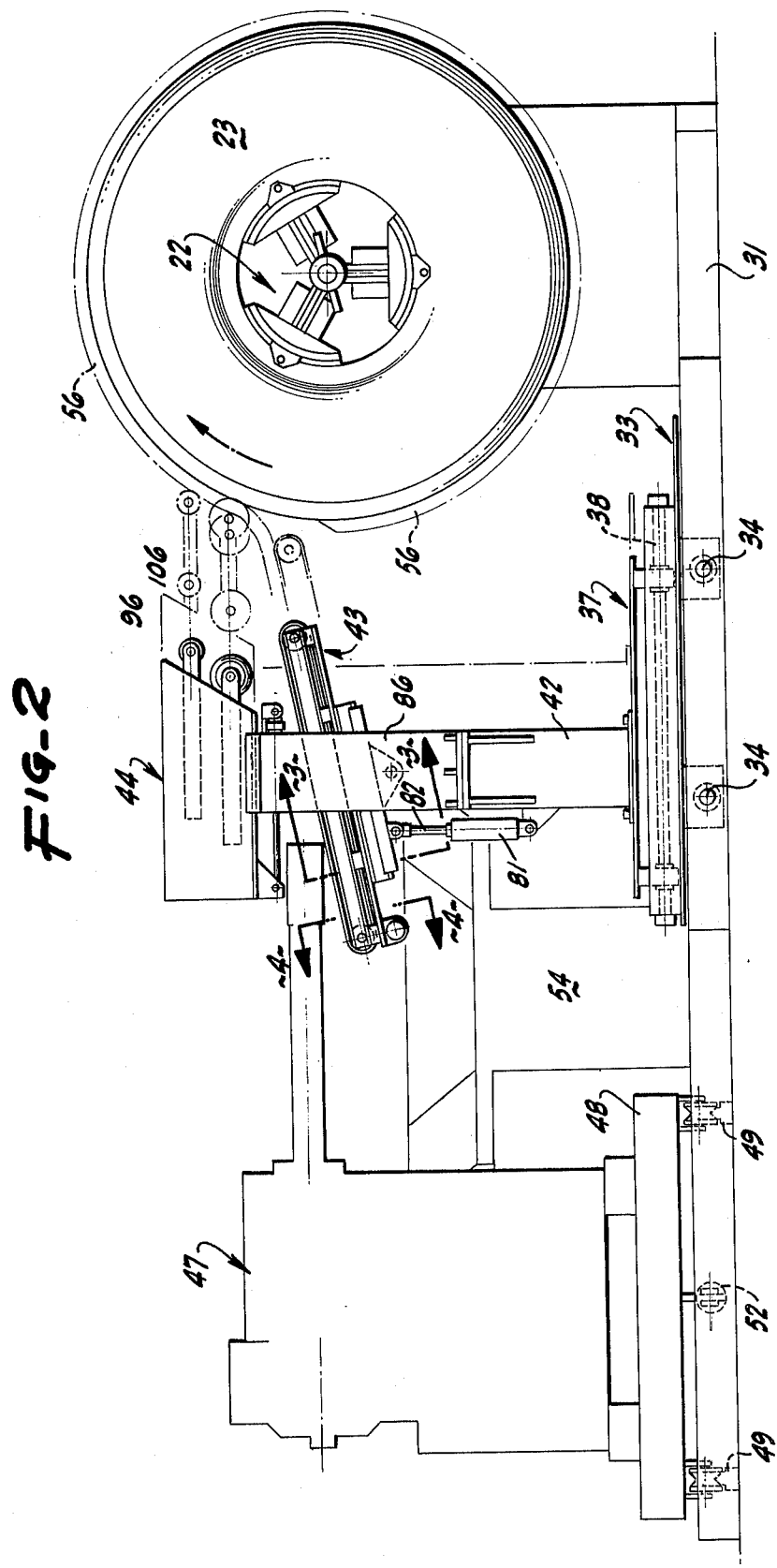

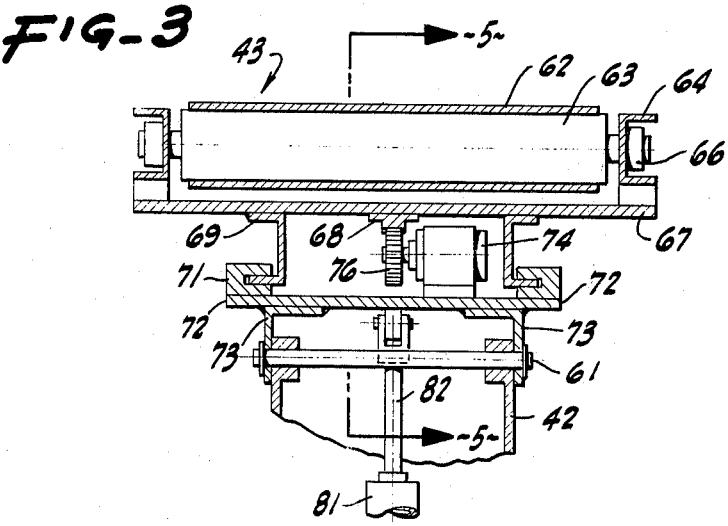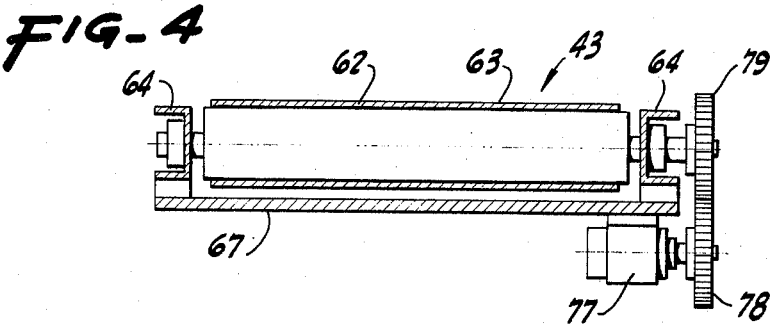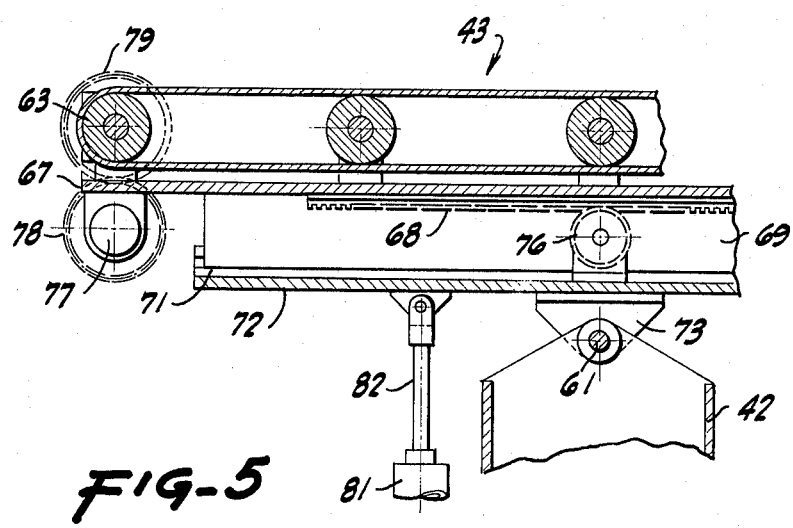

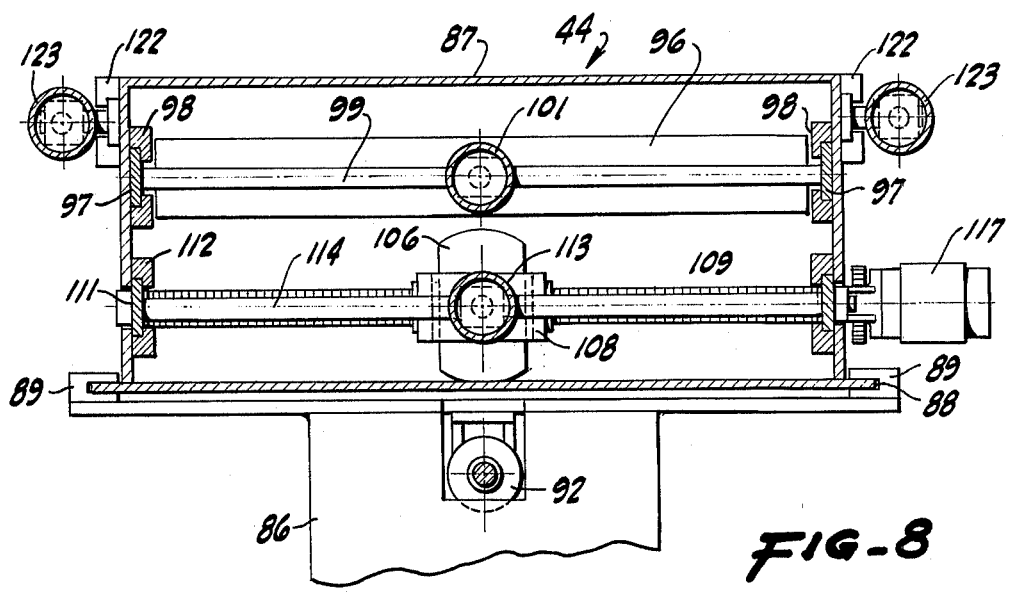
FIG-8
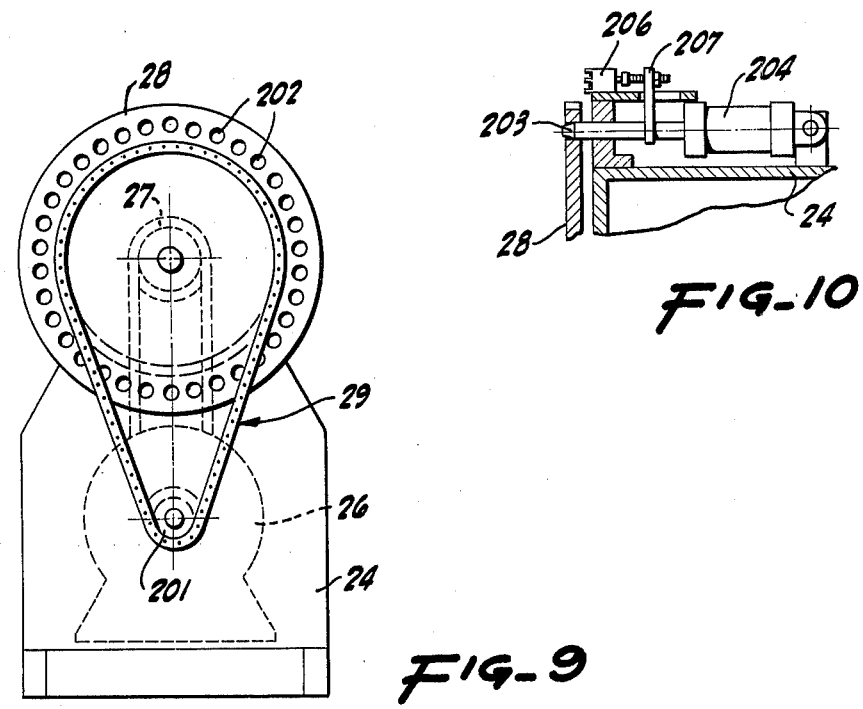
FIG-10
FIG-9

FIG-13
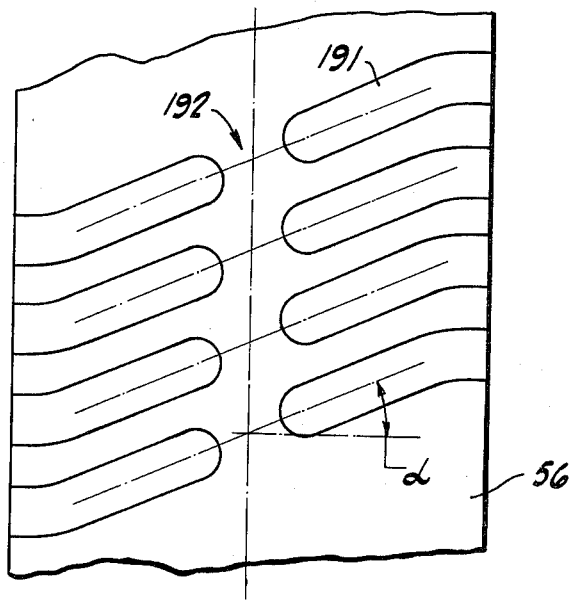
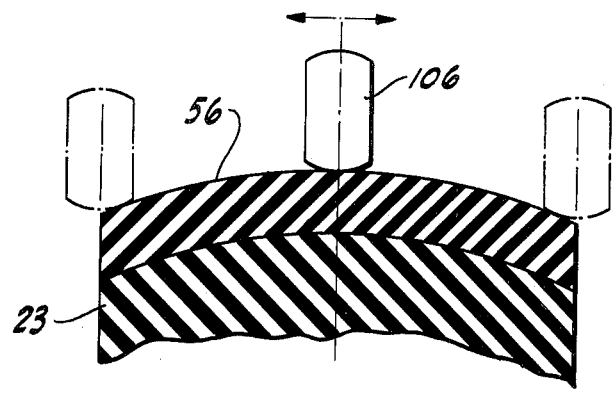
FIG-14

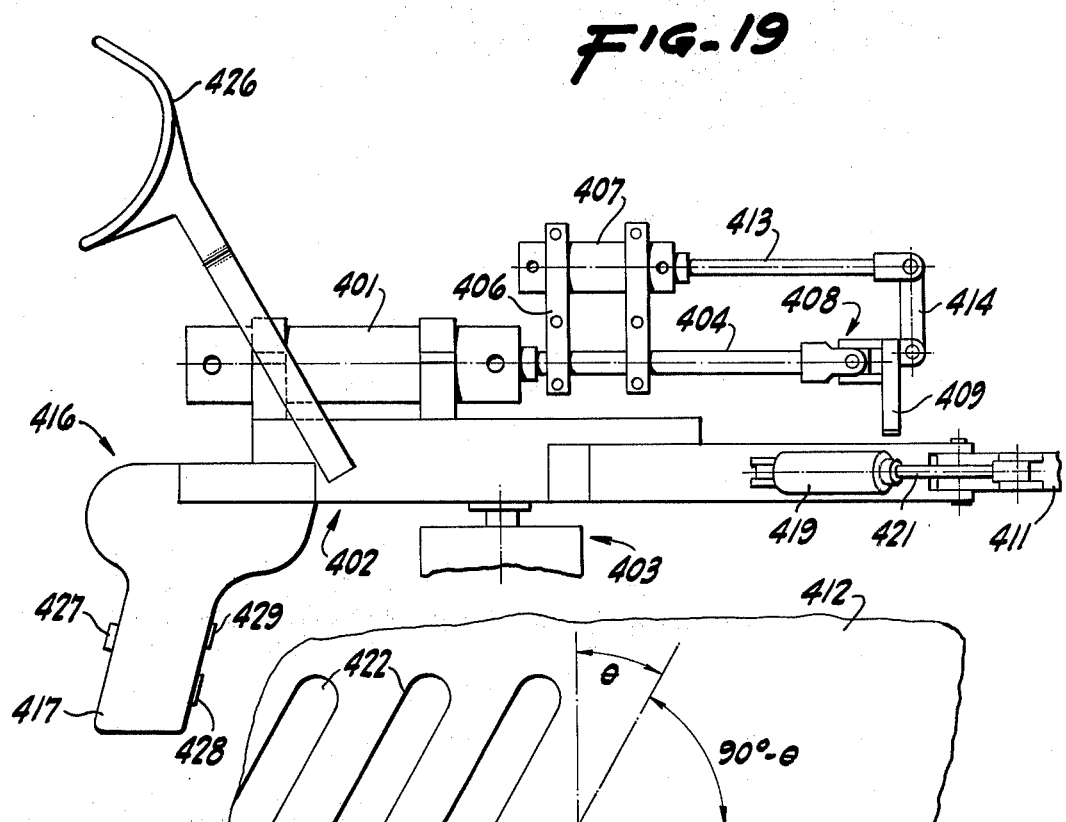
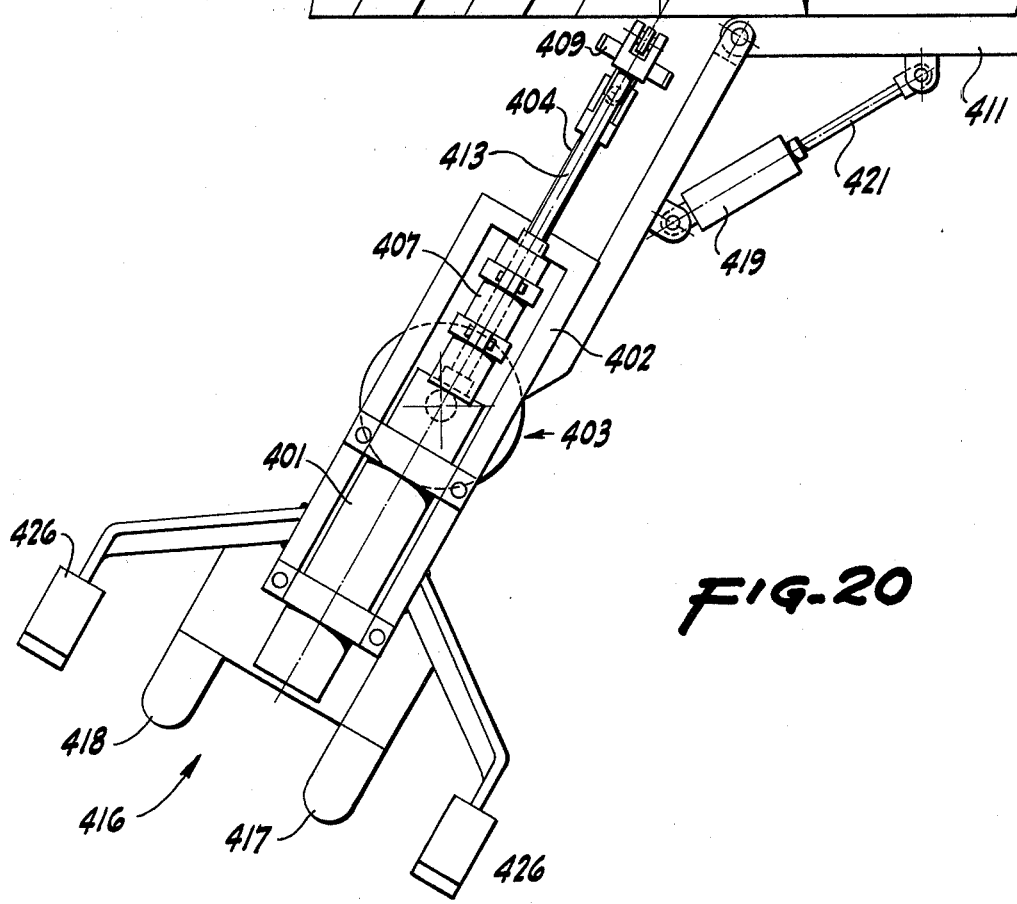

METHOD AND AUTOMATED SYSTEM FOR RETREADING TIRES

BACKGROUND OF INVENTION

Vehicle tires of all sizes are originally formed in molds wherein heat and pressure are applied to cure and mold the rubber employed in the tires. During use the tread of a tire is worn down and it is economically advantageous to apply new tread to undamaged tire carcasses. This new tread or retreading of the tire has in the past been normally accomplished by vulcanizing raw rubber to a buffed tire carcass in a pressurized mold by the application of heat to form new tread on the carcass.

There have been developed various improvements in tire recapping directed in part to the retreading or recapping of tires without the necessity of employing a pressurized mold. The problem of tire recapping molds becomes acute when dealing with very large sized pneumatic tires such as those employed on off the road vehicles like dirt movers and the like. Such tires may have a tread width of 2 to 3 feet or more with a tread diameter of 6 to 8 feet and larger. The original cost of tires this size may be of the order of $5,000 a piece so that recapping or affixing new tread thereto is almost an economic necessity. In the absence of recapping molds of these sizes, it has been conventional to apply new tread by hand by physically pounding raw rubber, tread lugs and spacers onto a buffed tire carcass and then to vulcanize the new tread thereon.

This procedure is quite time-consuming and normally requires a considerable number of man hours per tire while at the same time including numerous limitations which are undesirable from the viewpoint of the results achieved.

There have been developed methods of applying raw rubber to a buffed tire carcass very rapidly and precisely so that the rubber can then be vulcanized to the carcass as a smooth layer thereon. Tread lugs are then formed in the new rubber by cutting away portions thereof. A lengthy and expensive cutting operation is required and additionally the rubber removed during this cutting must be discarded for it has already been cured.

The present invention provides for the first time method and apparatus for applying raw rubber to a tire carcass and cutting the tread and the raw rubber prior to vulcanizing the rubber to the carcass.

SUMMARY OF INVENTION

The method and apparatus of the present invention operates to apply new tread to carcasses of pneumatic tires for vehicles and is particularly adapted to the retreading of very large tires such as those employed in off the road vehicles. Additionally the present invention is directed to the automatic or semi-automatic control of the application of tread or tread lugs during recapping so that only one man is required to carry out the method and operate the equipment. Precise control is provided over the steps of the method hereof so that prior art guesswork or "art" is precluded.

The method of the present invention comprises the mounting of a buffed tire upon a shaft for controlled rotation thereof and angularly indexed positioning of the tire. A sheet or strip of extruded raw rubber is conveyed to the tire carcass which is covered with cement and the carcass is wrapped evenly with a layer of raw rubber. This layer is stitched onto the carcass by the application of rolling pressure as the carcass is rotated with the pressure being first applied to the center of the layer and then laterally outward to firmly engage the layer on the carcass.

Tread designs are formed in the raw rubber about the tire carcass by cutting away portions of raw rubber applied to the carcass. With lug type designs two cuts are made simultaneously from the center of the carcass laterally outward in both directions and the tire is angularly indexed and the next pair of cuts made. Almost any shape of tire lugs or other tread design may be formed in accordance with the present invention for the cutting operations are controlled by templates having any of a variety of predetermined cam follower surfaces engaged by cam rollers on cutter arms. Provision is also made for electrically heating the cutters employed for defining the tread designs and this heating may be controlled to initiate same only at the beginning of a cut an to terminate same at the end of a cut, if so desired.

Raw rubber which is cut from the layer thereof applied about the tire carcass is available for reuse merely by reinserting same in a raw rubber extruder or mill wherein the cutaway pieces may be mixed with virgin material and are available for further use in tire retreading. After the raw rubber tread is completed upon the tire carcass this tread is vulcanized to the carcass by the application of heat and pressure as, for example, in a steam chamber, without the necessity of any type of mold for defining the tread.

The method hereof in simplest form provides for a single operator to semi-automatically cut portions from raw rubber on a tire carcass to form tire tread. A pivotally mounted hand operated unit includes means for aligning cutting means with a tire carcass and power operated means for pivoting and driving a cutter head through the raw rubber to form individual tread cuts. The following description relates to various sophistications in the method and apparatus thereof.

The automated apparatus of the present invention includes a control panel at which a single operator may control the entire process of rubber application and tread formation either automatically or semi-automatically. The apparatus includes a rubber extruder into which raw rubber is fed and from which there is discharged a continuous sheet or strip of raw rubber for applications to a tire carcass mounted upon a controllably rotatable shaft. The extruder is mounted for control motion and positioning longitudinally of the tire shaft and conveyor is adapted to extend from the extruder to the tire carcass for carrying the sheet or strip of raw rubber therebetween. The tire carcass is rotated as the strip of raw rubber is applied thereto and, if the extruder is of insufficient size to apply a single layer of desired width and depth to the tire carcass, the strip is wound about the carcass more than once to achieve the desired predetermined layer of raw rubber thereon, at which time the strip is cut off at the carcass. A "stitcher" is movable into engagement with the rubber layer about the carcass and in addition to an idler roller pressing the center of the layer against the carcass, the stitcher includes a stitching roller that is controllably movable laterally of the carcass as the carcass is rotated in order to firmly press the rubber layer of layers tightly against the carcass until the raw rubber is firmly engaged with the carcass.

The apparatus of the present invention furthermore includes cutting means mounted upon an upper platform movable toward and away from a mounted tire carcass upon a lower platform movable laterally of the tire carcass and carrying the aforementioned conveyor means and stitching means. The cutting means of the present invention incorporates a variety of different movements and basically comprises a pair of cutter arms carrying cutters at the forward end thereof and biased to bear against tread templates for controlling the cutting path. These cutter arms are simultaneously and similarly activated to move the cutters carried thereby generally laterally across the rubber layer on the tire carcass mounted on the apparatus of the invention with the cutters moving simultaneously outward from the vicinity of the center of the rubber layer on the carcass periphery or inwardly from the other edges of the layer. The configuration of cuts in the raw rubber layer about the periphery of the tire carcass by the cutting means hereof is determined by the shape of the tread templates and provision is made for electrically energizing the cutters or cutter heads, preferably only during the time that they are cutting rubber, and for automatically retracting the cutting means and repositioning the cutter arms at the end of each cut. The shaft carrying the tire carcass is automatically rotatably indexed by predetermined angular increments between tread cuts and the entire cutting operation is adapted to be fully automated so that it is only necessary to initiate the operation of cutting and all of the cuts required to form the complete pattern of tread lugs in the new rubber about the tire carcass will be completed without further human intervention other than the operator at a control panel.

On large tires employed on off the road vehicles for dirt movers and the like, the radial projections of the rubber are normally termed lugs instead of tread for oftentimes they actually resemble lugs disposed about the tire periphery and such lugs commonly have a depth of the order of 3 to 4 inches. It is also of particular importance that the lugs be connected together and, furthermore, that the depth of rubber connecting the lugs be of a specific dimension, all to the end of maximizing the integrity of the completed retreaded tire. A further point of substantial interest is the provision of a central rib circumferentially about the center of the tire tread. This central rib provides lateral stability to the tire in operating upon a vehicle, particularly when the vehicle may be driven through wet or loose dirt. The present invention is capable or providing this central rib merely by properly spacing the commencement or termination of the lug cuts.

Following the application of a layer of raw rubber about the buffed tire carcass and the formation of tread lugs therein by cutting operations as noted above, the raw rubber is vulcanized to the carcass by the application of heat and pressure, as by employing the open steam cure method. Pressurized steam in such a chamber may be employed to provide the requisite heat and pressure. No attempt is made in this brief description of the present invention to identify all of the movements or controls provided by this invention and reference is made to the following description of the preferred embodiment hereof wherein exemplary details are fully described.

DESCRIPTION OF FIGURES

The present invention is illustrated as to preferred steps of the process hereof and preferred embodiments of the apparatus of the invention in the accompanying drawings, wherein:

FIG. 1 is a plan view of retreading apparatus in accordance with the present invention;

FIG. 2 is a side elevational view of the apparatus of FIG. 1;

FIG. 3 is a sectional view of the conveyor of FIG. 2 taken in the plane 3—3 of FIG. 2;

FIG. 4 is a partial sectional view taken in the plane 4—4 of FIG. 2;

FIG. 5 is a longitudinal vertical sectional view of the conveyor taken in the plane 5—5 of FIG. 3;

FIG. 8 is a transverse vertical sectional view of the stitcher taken in the plane 8—8 of FIG. 6;

FIG. 9 is an end elevational view of the tire indexing means taken in the plane 9—9 of FIG. 1;

FIG. 10 is a partial vertical sectional view of the tire indexing solenoid taken in the plane 10—10 of FIG. 1;

FIG. 13 is a representation of a tread pattern formed with the present invention;

FIG. 14 is a representation of the stitching operation as performed by the present invention;

FIG. 19 is a schematic side elevational view of a simplified hand operated apparatus capable of carrying out the invention of the invention; and FIG. 20 is a schematic plan view of the simplified apparatus of FIG. 19.

DESCRIPTION OF PREFERRED EMBODIMENT

Figure 6:
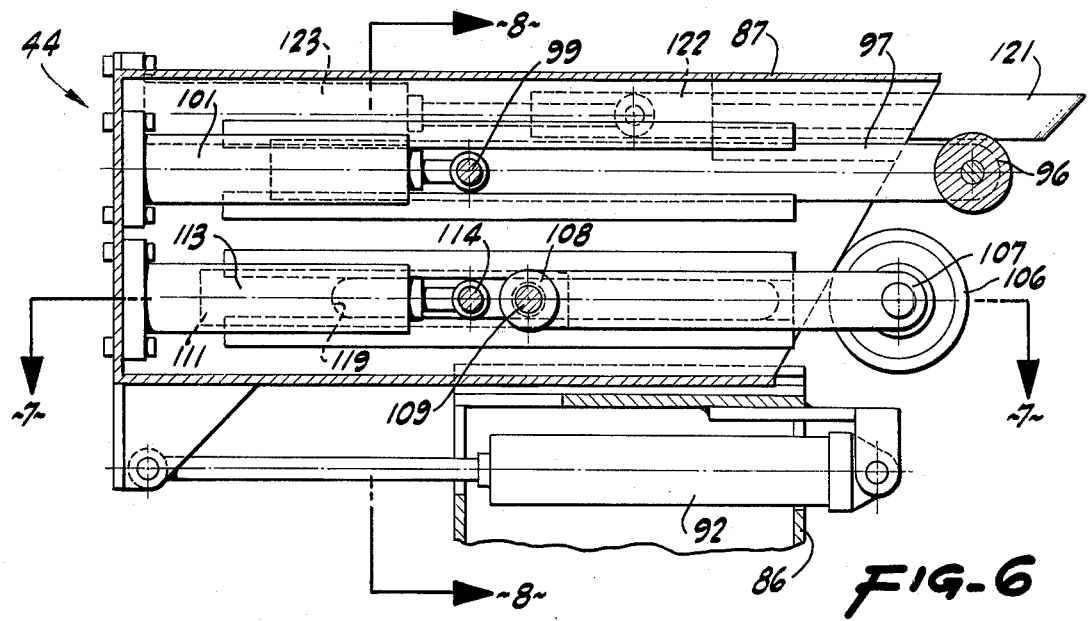
FIG. 6 is a longitudinal sectional view taken in a central vertical plane through the stitcher of FIG. 2.
Figure 7:
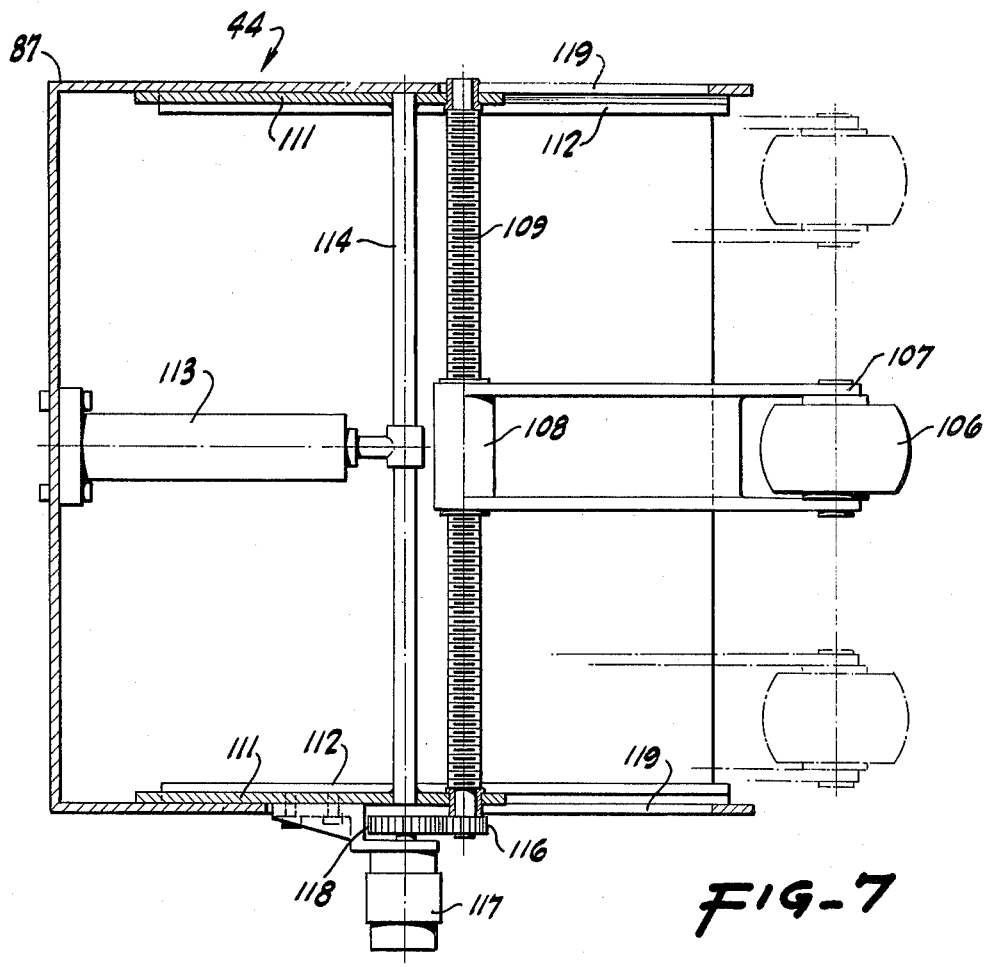
FIG. 7 is a sectional view taken in the plane 7—7 of FIG. 6.

The apparatus of the present invention admits of many variations from a highly automated and relatively sophisticated system to a relatively simple hand directed but power operated system. The various embodiments of the present invention are all capable of performing or at least assisting in the performance of the method of this invention which, in general comprises the application of a thick layer of raw rubber about a buffed tire carcass and the cutting of tire tread therein before vulcanization. The following description of the invention is set forth in the order of decreasing complexity.

The major components of the apparatus of the present invention and the means for moving and indexing these elements are illustrated in FIGS. 1 and 2 and, referring thereto, there will be seen to be provided a tire mounting shaft 21 having a pneumatically operated chuck 22 on an outer end thereof for engaging a tire carcass 23 at the center opening thereof for rotatably mounting the carcass. The mounting shaft 21 extends through a housing 24 wherein there is provided an electric drive motor 26 connected to rotate the shaft 21 as by means of a chain drive 27 and an indexing wheel 28 as by means of a chain drive 29. Further details of this indexing mechanism are illustrated in FIGS. 9 and 10 and are described below.

The apparatus of the present invention includes a base frame 31 which is formed as a rigid structural element of I-beams, for example, mounted upon a flat surface such as a concrete floor. The housing 24 carrying the mounting shaft 21 and drive means therefor is mounted upon this base 31. Considering the end of the base toward the tire mounting as the front of the base, a lower platform 33 is mounted for movement transversely across the base adjacent the portion of the tire carcass 23 overlying the base. This lower platform 33 is slidably mounted on a pair of parallel slide bars 34, in turn mounted between a pair of outer base members. A hydraulic piston 36 is mounted between a longitudinal base member and the under side of the lower platform 33 so that actuation of the piston slides the lower platform laterally back and forth across the base member. Upon the lower platform 33 there is disposed a movable upper platform 37 slidably disposed upon a pair of parallel slide bars 38 extending between sides of an upright frame 39 on the lower platform 33. A hydraulic cylinder 41 is mounted between the under side of the upper platform 37 and the mounting frame 39 for controllably moving the upper platform laterally across the lower platform, i.e., for moving the upper platform longitudinally of the base 31.

Upon the upper platform at the right side thereof as viewed toward the tire carcass 23, there is affixed a pedestal 42 which carries conveyor means 43 and "stitching" means 44. On the left side of the upper platform 37 looking toward the tire carcass 23 there is mounted cutting means 46. It will be seen that the controlled movement of the upper and lower platforms of the apparatus hereof provides for moving the conveyor and stitcher into alignment with the tire carcass 23 or for moving the cutter means 46 into alignment with the tire carcass 23. The purpose of these movements and the composition of the elements mounted upon the movable platforms is described below.

There is also mounted for movement upon the frame or base 31 a conventional rubber extruder 47. The extruder 47 is mounted upon a platform 48 that rides upon a pair of inverted V-rails 49 by means of circumferentially grooved wheels 51. The rails 49 extend transversely of the base or frame 31 between a pair of base members and a hydraulic cylinder 52 is mounted between a frame member and the under side of the platform 48 for controllably moving the platform laterally across the base on the rails 49. The exterior 47 is a conventional piece of apparatus adapted to receive raw rubber in various forms, to form this rubber and to force the rubber out of the front of the extruder whereat there is removably mounted a die element 53 defining the shape of the rubber extruded. The extruder is directed toward the front of the base or frame 31 with the extruder die overlying the platforms 33 and 37 and the control lateral movement of the extruder provides for aligning the output thereof with the desired portion of the periphery of the tire carcass 23 mounted on the shaft 21.

There is also mounted upon the frame or base 31 a control console 54 where a single operator may control the retreading process of the present invention by means described below.

The process of the present invention is directed to the application of raw rubber to a buffed tire carcass and the formation of tread or tread lugs therein for subsequent vulcanizing thereof to the carcass. To this end a tire carcass 23 is mounted for controlled rotation on the shaft 21 by a pneumatic or screw chuck 22 and it is noted that the mounting shaft 21 is parallel to the slide rods 34 of the lower platform 33. With the tire carcass mounted on the shaft 21, the extruder 47 is aligned with the carcass by controlled operation of the piston 52 and the conveyor means 43 is aligned to extend from beneath the extruder head 53 to the periphery of the tire carcass by operation of the piston 36 adjusting the lateral position of the lower platform 33. A layer of rubber 56 is extruded from the die head 53 of the extruder 47 and conveyed across the conveyor means 43 onto the periphery of the tire carcass 23 which is rotated by the mounting shaft 21. The stitcher 44 applies pressure to the raw rubber layer 56 on the tire carcass to seat the layer thereon as further described below. With the layer 56 disposed about the tire carcass, the lower platform 33 is moved by the piston 36 to align the cutting means 46 with the periphery of the tire carcass and incidentally to move the conveyor out of the way inasmuch as it is also carried on the movable platform. The cutting means 46 are then automatically operated in the manner described below to cut the grooves of predetermined configuration and depth from the layer 56 on the tire carcass in successive operations as the carcass is angularly indexed to thus form tread lugs of raw rubber on the tire carcass. At the completion of tread formation the raw rubber is vulcanized to the tire carcass to complete the retreading operation. Movable mounting of the extruder 47 and provision of the longitudinally movable upper platform 33 provides the apparatus with the capability of handling tire carcasses of different size and additional degrees of movement of the conveyor means and cutting means are also provided as further described below.

Considering now the conveyor means 43 it is noted that same is pivotally mounted on the pedestal 42 as by means of a pivot shaft 61. The conveyor includes an endless belt 62 extending over and above a plurality of rollers 63 mounted for rotation in a pair of longitudinal C-shaped tracks 64 by roller wheels 66 on the ends of axial stub shafts of the rollers. A conventional takeup bearing (not shown) may be provided to ensure tensioning of the conveyor belt about the rollers. A frame plate 67 carries the conveyor track 64 and is provided with a toothed rack 68 extending longitudinally of the underside thereof. Parallel depending angle irons 69 are also secured to the under side of the frame plate 67 in extension longitudinally thereof on opposite sides of the rack 68 and the lower lateral extensions of these angle irons are slidably disposed in longitudinal slots and a pair of bars 71 mounted on the rear base plate 72. Upstanding support members 73 are secured to the under side of the base plate 72 and extend over the sides of the pedestal 42 with the pivot shaft 61 extending through the support members 73 and the upper end of the pedestal 42, all as illustrated in FIGS. 3 to 5.

The conveyor 43 is adapted not only to be pivoted atop the pedestal 42 but also to be moved longitudinally of the pedestal back and forth toward or away from a tire carcass 23. Longitudinal movement of the conveyor is controlled by a small electric motor 74 mounted on the base plate 72 and having a gear 76 mounted on the motor shaft and disposed in toothed engagement with the rack 68 on the under side of the frame plate 67. It will be seen that operation of the motor 74 to rotate the attached gear 76 will drive the frame plate 67 back and forth via the rack 68 by means of the angle irons 69 sliding in the slots of the bars 71. Thus the position of the conveyor may be readily adjusted toward and away from the tire carcass 23 as indicated in FIG. 2.

The conveyor belt 62 is driven to move as precisely the same rate as the layer of rubber 56 is expelled from the extruder die head 53 and to this end there is provided a conveyor drive motor 77 which may be mounted on the underside of the conveyor frame plate 67 with a gear 78 secured to the motor shaft. A gear 79 secured to an outer end of one of the conveyor roller stub shafts meshes with the driven gear 78 on the shaft of the motor 77 so that operation of the motor 77 will rotate one of the conveyor rollers 63 to drive the conveyor belt 62 at a controlled rate of travel. Pivotal movement of the conveyor 43 is controlled by an hydraulic cylinder 81 shown in FIG. 2 as being pivotally mounted at the lower end on a lateral extension of the pedestal 42 and having a piston rod 82 extending upwardly therefrom into pivotal engagement with a conveyor base plate 72. Operation of this hydraulic cylinder 81 will thus be seen to pivot the conveyor about the pivot shaft 61. By providing for pivoting the conveyor and longitudinal movement of the entire conveyor, it is thus possible to accurately position the conveyor immediately beneath the die head 53 of the extruder in extension to a desired point on the periphery of tire carcasses 23 of different sizes that may be mounted on the shaft 21. It is desired for the layer of rubber 56 to be applied to the tire carcass 23 slightly above the center of curvature of the carcass as mounted on the shaft and this is made possible by the above-noted controlled motions of the conveyor.

In addition to the conveyor 43 which serves to apply the layer of rubber 56 onto the tire carcass, the present invention also provides means for initially affixing the layer to the carcass and such means are normally termed a "stitcher" so this terminology is herein employed, even though there is no actual sewing or passing of a tread or the like in and out of a material. The stitcher 44 is shown to be mounted upon the pedestal 42 above the conveyor 43 by vertical support members 86 extending upwardly on opposite sides of the conveyor 43 from lateral extensions on the pedestal 42. The stitcher 44 includes a generally rectangular housing 87 having an inclined open front directed toward the tire carcass 23 and having laterally extending longitudinal flanges 88 along the bottom sides of the housing and slidably disposed in slotted parallel bars 89 secured to a fixed base plate 91. The base plate 91 is secured across the top of the vertical support members 86 and the housing 87 is thus slidably movable relative to the pedestal 42 toward and away from a tire carcass 23 mounted on the shaft 21. Controlled translation or movement of the stitcher housing 87 is accomplished by a hydraulic cylinder 92 disposed in the housing and mounted between the back of the housing and an upright post 93 secured to the base plate 91 and extending through a longitudinal slot 94 in the bottom of the housing. Translation of the stitcher housing 87 by the hydraulic cylinder 92 serves to place the housing in adjusted position adjacent the periphery of a tire carcass 23 having the layer of rubber 56 applied thereto. Further with regard to the application of the layer 56 to the tire carcass 23, it is noted that the circumference of the tire carcass is first buffed to present a roughened but generally regular surface for application of the layer. In accordance with conventional practice, the thin coating of adhesive is applied to the circumference of the buffed tire carcass immediately preceding the application of the raw rubber layer 56 thereon. In order to secure the layer to the carcass sufficiently to accommodate subsequent operations thereon, the stitcher of the present invention is employed to press the layer onto the carcass. To this end the stitcher includes an elongated idler roller 96 extending laterally across the open front face of the stitcher housing 87 and rotatably mounted in a pair of slide bars 97 disposed one at each end of the roller and extending rearwardly therefrom into the housing 87. The slide bars 97 are slidably disposed in tracks 98 mounted on the inner sides of the housing 87 and a crossbar 99 extends between the slide bars interiorly of the housing. A hydraulic piston 101 is mounted interiorly of the stitcher housing 87 between the rear wall thereof and the crossbar 99 of the idler roller 96 so that operation of this hydraulic cylinder serves to move the idler roller in and out of the front of the housing 87. As the rubber layer 56 is applied to the tire carcass the idler roller 96 is extended outwardly to engage this layer and thus to press at least the center thereof tightly against the tire carcass so as to firmly adhere the layer to the carcass. It will be noted that the tire carcass is normally buffed to curve gently downward from a center crown about the circumference thereof and thus the roller 96 will generally press the center of the layer 56 against the crown of the carcass.

In addition to the general attachment of layer to carcass the present invention provides for "stitching" the remainder of the layer to the carcass laterally outward of the crown of the carcass. To this end there is also provided in the stitcher 44 a controllably movable stitcher roller 106 having a partially spherical periphery and pivotally mounted for rotation in a yoke 107 extending from a traveling nut 108 disposed on a worm gear 109 within the stitcher housing 87. The worm gear 109 extends transversely across the interior of the housing 87 and is carried at opposite ends thereof by slide bars 111 disposed in tracks 112 mounted on the interior of the sides of the housing and extending longitudinally thereof toward the open end of the housing. The stitcher roller is movable in and out of the open end of the housing 87 by means of a hydraulic cylinder 113 mounted between the back wall of the housing and a bar 114 extending laterally across the housing between the slide bars 111. Additionally the stitcher roller 106 is movable laterally across the open end of the housing 87 by rotation of the worm gear 109. Controlled rotation of the worm gear 109 may be accomplished by the provision of a gear 116 on an end of the worm shaft which is controllably rotated by a motor 117 through a gear 118 meshing therewith. With the motor 117 mounted exteriorly of the housing 87, a slot 119 is formed in the side of the housing to accommodate extension of a motor mount through the side of the housing which moves longitudinally of the housing with the slide bars 111.

The stitcher roller 106 is employed in the present invention to press the layer of rubber 56 tightly onto the buffed tire carcass 23 by laterally placing the stitcher roller adjacent the center of the layer 56 and rotating the tire carcass with the layer thereon. As the tire carcass is rotated, the stitcher roller 106 is slowly moved laterally outward of the crown of the carcass by operating the motor 117 to rotate the worm 109 and thus drive the following nut 108 laterally across the housing. This presses the layer onto the carcass while pressing any possible air bubbles laterally outward of the layer. The stitcher roller is laterally moved out to the edge of the layer 56 and is then brought back to the center and moved laterally outward from the crown on the other side of the layer to perform the same function as described above. It will be appreciated that the idler roller 96 is first extended outwardly from the stitcher to press the center of the layer 56 onto the carcass 23. This idler roller 96 is then retracted by operation of the hydraulic cylinder 101 and the stitcher roller 106 is extended out of the front of the housing at the center or crown of the tire carcass by operation of the hydraulic cylinder 113. After the stitcher roller 106 has completed pressing the layer 56 onto the carcass from the center outward the stitcher roller is retracted by the cylinder 113. The edges of the layer 56 may then be trimmed even with the sides of the tire carcass if there is an overlap as by means of hydraulically operated trimming knife blades 121 which may be movably mounted at the sides of the housing 87 for extension forwardly therefrom. The knife blades 121 may be mounted in guide means 122 for extension and retraction by hydraulic cylinders 123 mounted on the sides of the housing 87. It will be appreciated that the stitcher 44 is movable laterally of the layer 56 by the upper platform 37 so that the knives 21 may be individually aligned with the edges of the layer to be trimmed and the knives are adapted for separate operation. It is also to be noted that the width of the layer 56 may, in fact, be substantially greater than the width of the stitcher 44 and furthermore that the layer 56 may be comprised of a pair of side-by-side layers and/or a plurality of layers one atop the other. The stitching operation remains the same, however, and it is only necessary to appropriately position the stitcher for stitching or pressing an individual strip of the layer 56 onto the carcass and then reposition the stitcher to perform the same operation upon another strip of the layer. Under those circumstances wherein two or more strips are employed to form the single layer 56, the die head 53 of the extruder is preferably formed to extrude a strip having tapered edges so that the edges of adjacent strips overlie each other on the diagonal. It is also noted that for certain applications of the present invention it may be desirable to pivot the stitcher parallel to the base plate 91 thereof, particularly if the buffed tire carcass has a marked curvature across the buffed surface thereof. This may be readily accomplished by locating the stitcher base plate 91 above the support members 86 and pivoting the base plate 91 to a lower base plate secured across the top of the support members 86. Suitable locking means may be provided for this pivotal connection.

Figure 11:
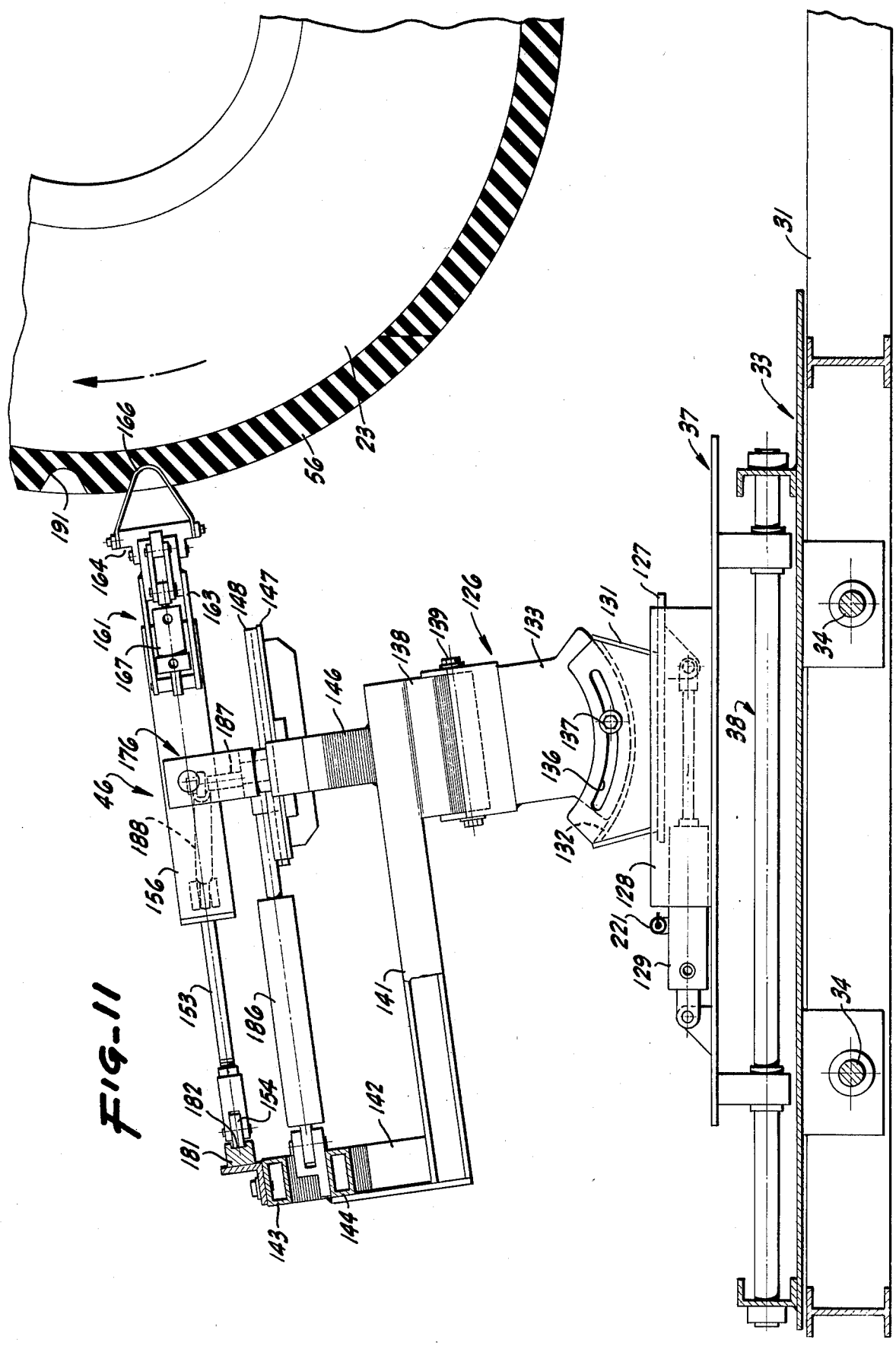
FIG. 11 is a side elevational view of the cutting means of the present invention.
Figure 12:
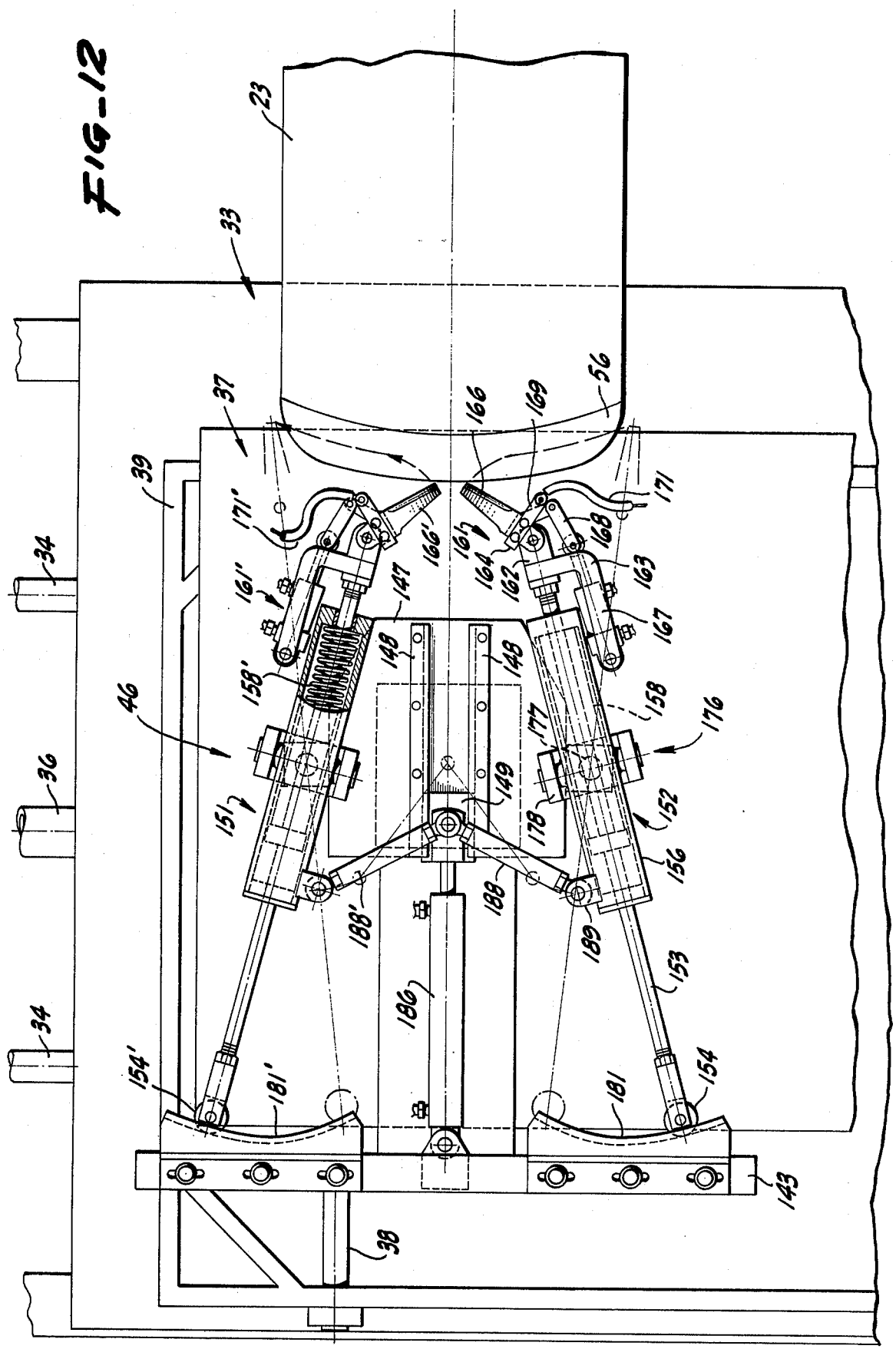
FIG. 12 is a top plan view of the cutting means.

Following attachment of the layer of raw rubber 56 about the periphery of the buffer tire carcass 23, the hydraulic cylinder 36 is operated to move the lower platform 33 toward the bottom of FIG. 1 to align the cutting means 46 with the center of the layer 56. Referring now to FIGS. 11 and 12, it will be seen that the cutting means 46 includes a stand 126 extending upwardly from a bottom plate 127 slidably mounted between a pair of side rails 128 affixed atop the upper movable platform 37. The rails 128 are disposed parallel to the slide bars 38 of the upper platform 37 and a hydraulic cylinder 129 is pivotally mounted on the upper platform 127 with the piston rod thereof pivotally connected to the underside of the pedestal plate 127 for moving the pedestal back and forth along the tracks 128. The pedestal 126 is designed to incorporate orthogonal pivoting and to this end may include a pair of spaced apart parallel upright side walls 131 mounted atop the bottom plate 127 and extending longitudinally thereof. A concave plate 132 extends between the side walls 131 and an intermediate member 133 having a convex under surface is disposed upon this plate between these side walls. Parallel arcuate slots 136 that are concave upwardly are provided in each of the side walls above the plate 132. Axially aligned bolts 137 extend through the slots 136 into threaded engagement with the intermediate element 133 with a washer between each bolthead for fixing angularly adjusted positions of the intermediate element relative to vertical. Atop the intermediate element 133 there is provided a similar arrangement to that described below wherein an upper element 138 has a convex under surface disposed upon a concave upper surface of the intermediate element orthogonally to the engagement of intermediate element and side walls 131. Locking bolts 139 extend through arcuate slots into threaded engagement with the upper element 138 for fixing the angular position of the upper element with respect to vertical.

It will be seen that the foregoing pedestal arrangement provides for tilting of the cutting means in two perpendicular planes with one of these planes being parallel to the axis of the mounting shaft 21.

A beam structure 141 extends rearwardly of the upper element 138 and at the rear of such beam structure a pair of support arms 142 are inclined outwardly and upwardly with upper and lower crosspieces 143 and 144 connected therebetween. Directly above the center of the pedestal 126 there are provided a pair of side arms 146 extending laterally outward and upward from the beam structure 141 and supporting a plate 147 therebetween. Upon the cross plate 146 there are mounted a pair of parallel guides 148 having overlying upper flanges defining a guide way within which there is disposed a slide block 149 adapted to slide longitudinally of plate 147 between the guide bars.

The cutting means 46 includes a pair of cutter arms 151 and 152 which are mirror images of each other and consequently only one of these arms is described in detail below. Considering now the cutter arm 152, as illustrated in FIGS. 11 and 12, there will be seen to be included a cam bar 153 having a cam follower such as a wheel 154 rotatably mounted on the outer end thereof and including longitudinal adjusting means with the bar extending axially through a cylinder 156. The bar 153 has a flange 157 within the cylinder 156 and a coiled spring 158 is compressed between the forward end of the cylinder 156 and this flange 157. It is noted at this point that, inasmuch as the cutter arms 151 and 152 are substantially identical, the same numbers are used for like parts on each with primed numbers being employed for the arm 151. At the forward end of the bar 153 there is mounted a cutting head 161 including a block 162 threaded on the end of the bar 153 and fixed by a locking nut with a pair of L-shaped side arms 163 extending laterally outward therefrom and rearwardly thereof. A crossarm 164 is pivotally mounted on the block 162 with the pivot axis perpendicular to the arms 163. A generally U-shaped knife member 166 is mounted on the crossarm 164 with the arm extending between the ends of the legs thereof and the knife extending forwardly of the crossarm.

Provision is made for controllably pivoting the knife 166 about the pivot axis thereof in the plane of FIG. 12 which is transversely to the surface of the layer 56 of rubber applied to the tire carcass 23. Such means includes a hydraulic cylinder 167 pivotally mounted at the rear end between the outer ends of the arms 163 and having a forwardly extending connecting rod pivotally mounted to an intermediate link 168 that, in turn, is pivotally connected to a side projection 169 on the crossbar 164. It will be seen that operation of the hydraulic cylinder 167 will pivot the knife 166 through the linkage 168 and crossarm 164. Provision is also made for electrically heating the knife 166 by means of electrical conductors 171 connected to opposite ends of the U-shaped knife by appropriate means insulating same from the crossarm 164.

The cutting arms 151 and 152 are mounted by the equivalent of gimbals 176 engaging the cylinders 158. These gimbals 176 are mounted atop the forward inclined support arms 146 on the pedestal 126 and include a lower pivot 177 about a vertical axis and an upper pivot 178 about a horizontal axis.

The knives 166 of the cutting means 46 are controlled to move along predetermined paths by templates or cams 181 removably mounted on the upper crossbar 143 of the cutting means. The cam 181 is formed with a groove 182 within which the wheeled cam follower 154 moves so that the knife 166 traverses a path determined by the cam or template 181. Movement of the cam follower along the template and thus movement of the cutting arms is accomplished by a hydraulic cylinder 186 having the rear end thereof pivotally mounted upon the lower crosspiece 144 of the pedestal and having a forwardly extending piston rod secured to the slide block 149. As noted above, the slide block 149 is adapted to be moved longitudinally in the guide way between the guides 148 and an upward extension 187 on the slide block has a pair of pivotally mounted links 188 extending laterally outward from the top thereof into pivotal engagement with lugs 189 secured to the cutting arm cylinders 156 adjacent the rear thereof. It will be seen that actuation of the hydraulic cylinder 186 to move the slide block 149 will pivot the cutting arms 151 and 152 to move the cam followers 154 thereof from the outer edges of the templates 181 inwardly along the templates to the inner ends of the templates, as indicated in phantom in FIG. 12. This will cause the cutters 166 to be traversed laterally outward across the face of the rubber 56 to form tread grooves 191. It is particularly noted that the cutter arms 151 and 152 move simultaneously away from the center of the rubber strip 56 so that equal and opposite lateral forces are applied to the strip by the cutters.

The present invention provides a capability of forming substantially any desired tread pattern. In FIG. 13 there is illustrated one possible tread pattern that may be formed by the present invention. The tread grooves 191 will be seen to extend laterally outward of the center line of the strip 56 at an angle $\alpha$ to align perpendicular to the center line. This angle $\alpha$ is set by tilting the cutting means 46 about the upper locking bolts 139. Deviation of the tread grooves from the cutting plane established at the angle $\alpha$ is provided by the templates or cams 181 and in the example of FIG. 13 these outer ends of the grooves depart from the tilted angle of the plane to terminate normal to the sides of the tire. It is also noted that the inner ends of the grooves on opposite sides of the tire periphery are spaced apart to form a central ridge or lug 192 extending along the center line of the strip 56. This circumferential center lug 192 is highly advantageous in providing lateral stability of the resultant tire and is normally provided in new molded tires but is conventionally unavailable in retreaded tires. By the employment of a pair of oppositely operating cutting arms the present invention makes it possible to form this center or circumferential lug 192 in retreading operations.

The present invention operates to form a pair of tread grooves by actuation of the cutting arms as described above and then operates to index the tire carcass 23 into position for formation of the next pair of tread grooves. This indexing of the tire carcass is accomplished by means illustrated in FIGS. 9 and 10. The motor 26 has the shaft 201 extending from both ends thereof with one end of the shaft connected to the drive chain 27 for rotating the tire shaft 21 and the other end of the motor shaft connected to the belt or chain drive 29 for rotating the index wheel 28. This index wheel is provided with apertures 202 about the periphery thereof. An indexing pin 203 carried by an actuator such as a cylinder 204 is mounted in alignment with a point on the circle of aperture centers. The indexing pin 203 has substantially the same diameter as the diameter of the aperture 202 and is adapted to be inserted in an aperture aligned therewith for positively locking the index wheel in position and thus the motor shaft 201 in this position. With the indexing pin 203 extended, as illustrated in FIG. 10, the index wheel 28 is locked in position and through the chain drive 29 the motor shaft is locked in position. Operation of the cylinder 204 to retract the indexing pin from the index wheel allows the wheel to be turned so that the motor shaft can turn. The outer end of the index pin is preferably tapered, as illustrated, to readily fit into successive apertures 202 about the index wheel. Provision is also made for energizing the motor 26 to rotate the motor shaft and thus turn the tire carcass carried on the shaft 21. A normally closed switch 206 is shown to be mounted in position for engagement by an arm 207 carried by the index pin so that, upon retraction of the pin, the switch closes to energize the motor 26 and turn both the index wheel and tire carcass. The index wheel is intended to be angularly rotated only enough to insert the index pin in the next aperture 202 on the wheel and this may be accomplished, for example, by momentarily operating the cylinder 204 to retract the pin 203 so that the motor 26 is energized to rotate the index wheel. The cylinder 204 is then oppositely energized to force the index pin 203 to the left in FIG. 10 so that the pin rides on the index wheel until the next aperture 202 aligns with the pin. Upon alignment of pin and aperture, the pin is forced into the aperture to open the switch 206 and de-energize the motor 26 and also to lock the index wheel in indexed position. It will of course be appreciated that alternative indexing means may be provided for the present invention; however, it is important that the tire carcass be mounted for controlled angular displacement and accurate control over successive positions of the carcass fit proper locations of tread grooves on the rubber strip about the carcass.

The system of the present invention is particularly adapted to automated operation and there follows a discussion of controls and sensors for carrying out such an automated operation, particularly with regard to the actual formation of tread grooves in a hot rubber strip 56 applied to the periphery of a buffed tire carcass.

The method of the present invention will be seen from the foregoing description of the system hereof to comprise a series of successive steps for the application of a strip of hot, raw or uncured rubber about a buffed tire casing and the trimming and stitching of such strip onto the casing. This is then followed by the simultaneous cutting of pairs of tread grooves in the hot rubber layer or strip by a succession of steps including moving a pair of pivotally mounted cutters into proximity with the layer, heating the cutters and pivoting them to initiate the two grooves, moving the cutters laterally outward across the layer or strip away from each other until the groove is completed, and de-energizing the cutters as they move out of the layer, retracting and repivoting the cutters and indexing the tire carcass to the position for the next cut. The system of the present invention described above is capable of automatically carrying out the steps of the method hereof, as set forth below.

Figure 15:
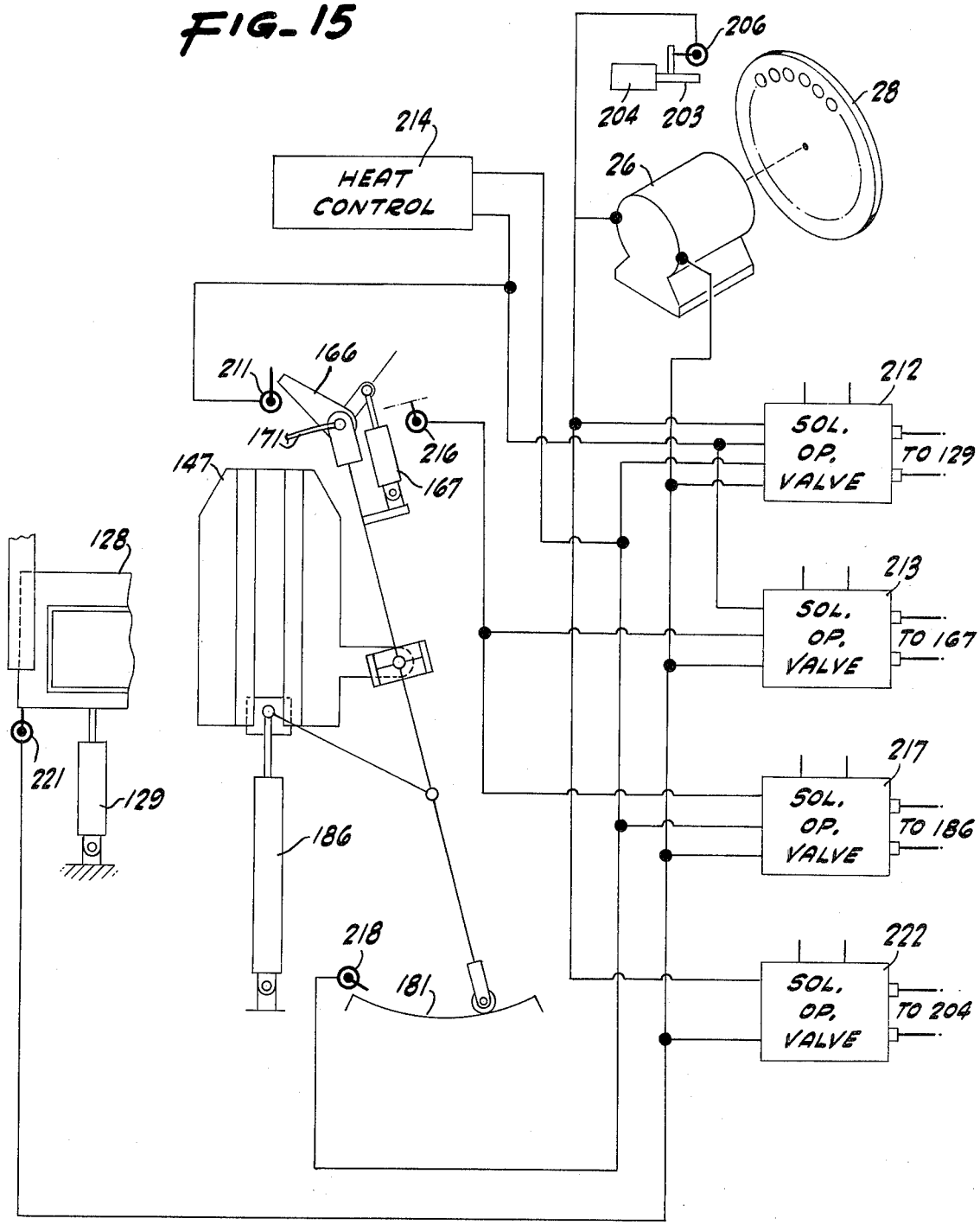
FIG. 15 is a schematic representation of automated controls of the system hereof.

Referring now to FIG. 15, there will be seen to be illustrated a partial diagrammatic representation of operable portions of the cutting means 46 of the system hereof. In the drawings of the present invention there is employed for convenience the symbol o as a representation of a microswitch or the like having an actuator extending therefrom. The microswitches of the system are connected to solenoid operated valves which in turn operate the hydraulic cylinders of the system. These valves are conventional in controllably applying hydraulic pressure to either end of a hydraulic cylinder and exhaust or return to the opposite end or applying pressure to both ends of the cylinder. A switch 211 is shown to be mounted in extension from the cutter plate 147 for operation by engagement with the rubber layer 56 as the cutter means is moved toward the tire carcass by the cylinder 129. Switch 211 is connected to a solenoid operated valve 212 which places the cylinder 129 in hold position, i.e., applies pressure to both ends thereof so as to stop the forward progress of the cutting means in the proper position for operation of the cutters. This switch 211 is also connected to a solenoid operated valve 212 which operates the hydraulic cylinder 167 for pivoting the cutters 166 to initiate the cut of the tire grooves. In addition switch 211 is connected to cutter heating controls 214 to pass a heating current through the cutters 166 as they are pivoted to commence the cuts.

There are also preferably provided time delay means in the system hereof for suitably delaying the start of an operation until the preceding operation has been fully completed. Such means may be incorporated in microswitches and relays included in the system hereof and may for example include stepping switches wherein a predetermined number of steps thereof are required before an output occurs.

The cutters 166 are pivoted until the crossarm 169 thereon engages and operates a second microswitch or the like 216 which is connected to solenoid operated valve 213 for applying pressure to both ends of the hydraulic cylinder 167. This then locks the cutters 166 in line with the cutter arms. The switch 216 is also connected to a solenoid operated valve 217 which is connected to operate the hydraulic cylinder 186 for pivoting the cutter arms 151 and 152 and causing the cam rollers thereof to follow the cams or templates 181. The heated cutters thus are moved laterally across the hot rubber layer 56 to form the tread grooves 191. As the cutter arms reach the inner ends of the templates 181 they engage a further microswitch or the like 218 which is connected to the heat control means 214 for de-energizing the cutters and to solenoid operated valve 217 for applying hydraulic pressure to both ends of the hydraulic cylinder 186 and thus terminating pivoting of the cutter arms. It is noted at this point that the cutting of uncured rubber is performed by sharpened cutting blades which are heated by the passage of current therethrough to facilitate the cutter operation. As the heated cutters pass through the rubber, a substantial amount of heat is carried away from the cutter; however, as soon as the cutter emerges from the rubber into the air, the present invention provides for terminating the application of heat by ceasing the flow of current through the cutter in order to prevent overheating of the cutter, inasmuch as air will not conduct the heat away to the same extent as the rubber through the which the cutter has been passing.

The above-described operations of the present invention provide for the formation of a pair of laterally extending tread grooves inasmuch as both cutters are operated at the same time in the manner described above and the cutting means is then retracted by moving the platform 128 away from the tire carcass. Switch 218 operates the solenoid operated valve 212 to apply hydraulic pressure to the forward end of the cylinder 129 and exhaust the rear end so that the platform 128 is retracted until it engages a further switch 221 which is connected to the solenoid operated valve 212 to apply pressure to both ends of the cylinder 129 and thus lock it in retracted position. The switch 221 is connected to solenoid operated valves 213 and 217 so that when the cutting means are retracted, the cutters 166 are pivoted into original position, as illustrated in FIG. 12, by cylinders 167, and the cutting arms 151 and 152 are pivoted back into the positions shown in FIG. 12 by the hydraulic cylinder 186. In addition switch 221 is connected to a further solenoid operated valve 222 which actuates hydraulic cylinder 204 to retract the index pin 203 from the index wheel 28 and is connected to the control of motor 26 to energize this motor to rotate the index wheel 28. It will be seen that, as the index pin 203 is retracted and the index wheel 28 starts to rotate, the index pin is incapable of entering another opening in the index wheel until such an opening aligns with the index pin. This retraction of the index pin 203 opens switch 206 which is connected to solenoid operated valve 222 to operate hydraulic cylinder 204 for urging the index pin toward the index wheel. The index pin thus rides upon the index wheel until the next aperture 202 is aligned with the index pin and at this point the pin enters the aperture to close the switch 206 which is connected to the solenoid operated valve 222 for locking the cylinder 204 with the pin 203 extended. In this manner the index wheel is then locked in indexed position with the tire carcass and rubber layer 56 thereon in position for the formation of another tread groove across the rubber layer. Full automation of the operation is accomplished by also connecting the switch 206 to the solenoid operated valve 212 for actuating the hydraulic cylinder 129 to move the cutting means toward the tire carcass until the switch 211 is closed and the sequence of operations repeated. Appropriate additional relays and microswitches are preferably incorporated in the system in conventional manner to implement fully automatic operation.

The system of the present invention may be readily operated by a single operator at the control panel 54 whereat controls are provided for initiating automatic operation of the system or, alternatively, for individually controlling each of the operations. The various steps of applying a rubber layer, stitching the layer and trimming the layer may also be automated or may be individually controlled from the console 54. It will be further appreciated that rubber cut from the layer 56 in the formation of the tread grooves 191 remains raw rubber and may thus be reinserted in the extruder 47 as raw material. The cutting operation of the present invention has the temperature thereof carefully controlled preferably to a temperature of the order of 250° but less than 300° to prevent partial curing of the rubber as it is cut. As noted above, the formation of inclined or skewed treads, as illustrated in FIG. 13, for example, is accomplished by appropriately inclining the cutting means as described above. Fore and aft pivoting of the cutting means is provided to accommodate proper alignment of the cutting means with tire carcasses of different diameters.

Figure 16:
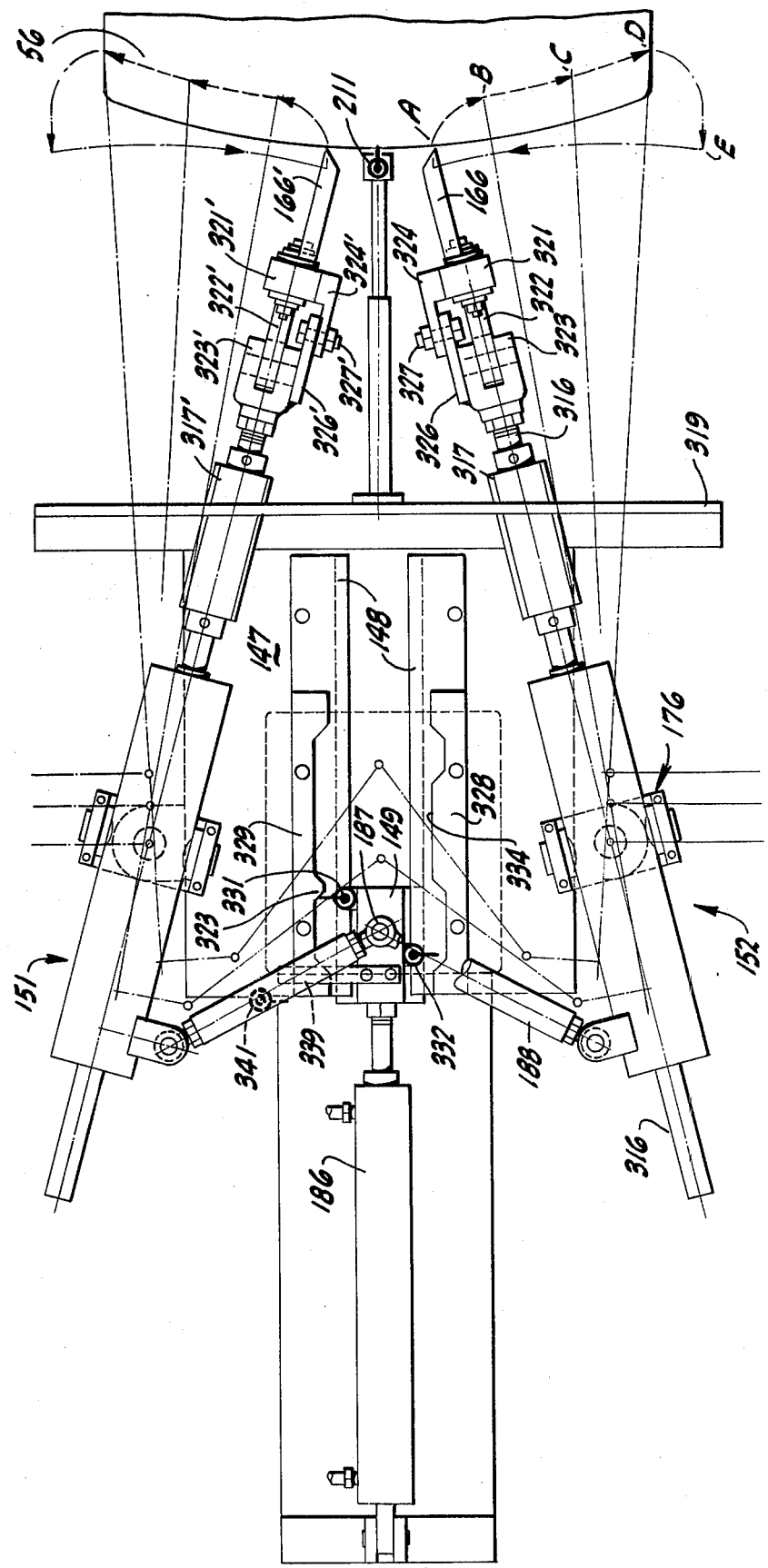
FIG. 16 is a top plan view of an alternative cutting means.
Figure 17:
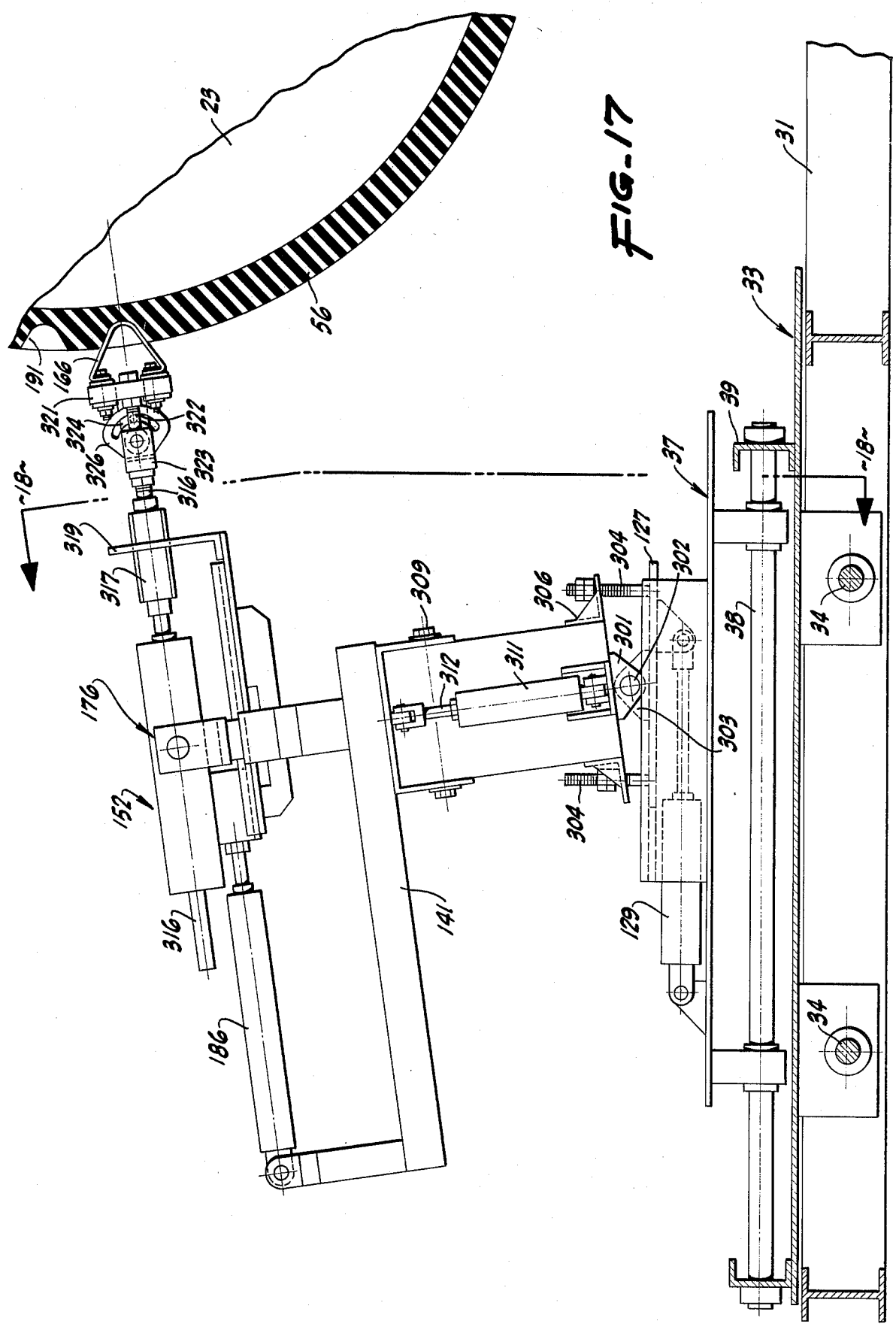
FIG. 17 a a side elevational view of the cutting means of FIG. 16.
Figure 18:
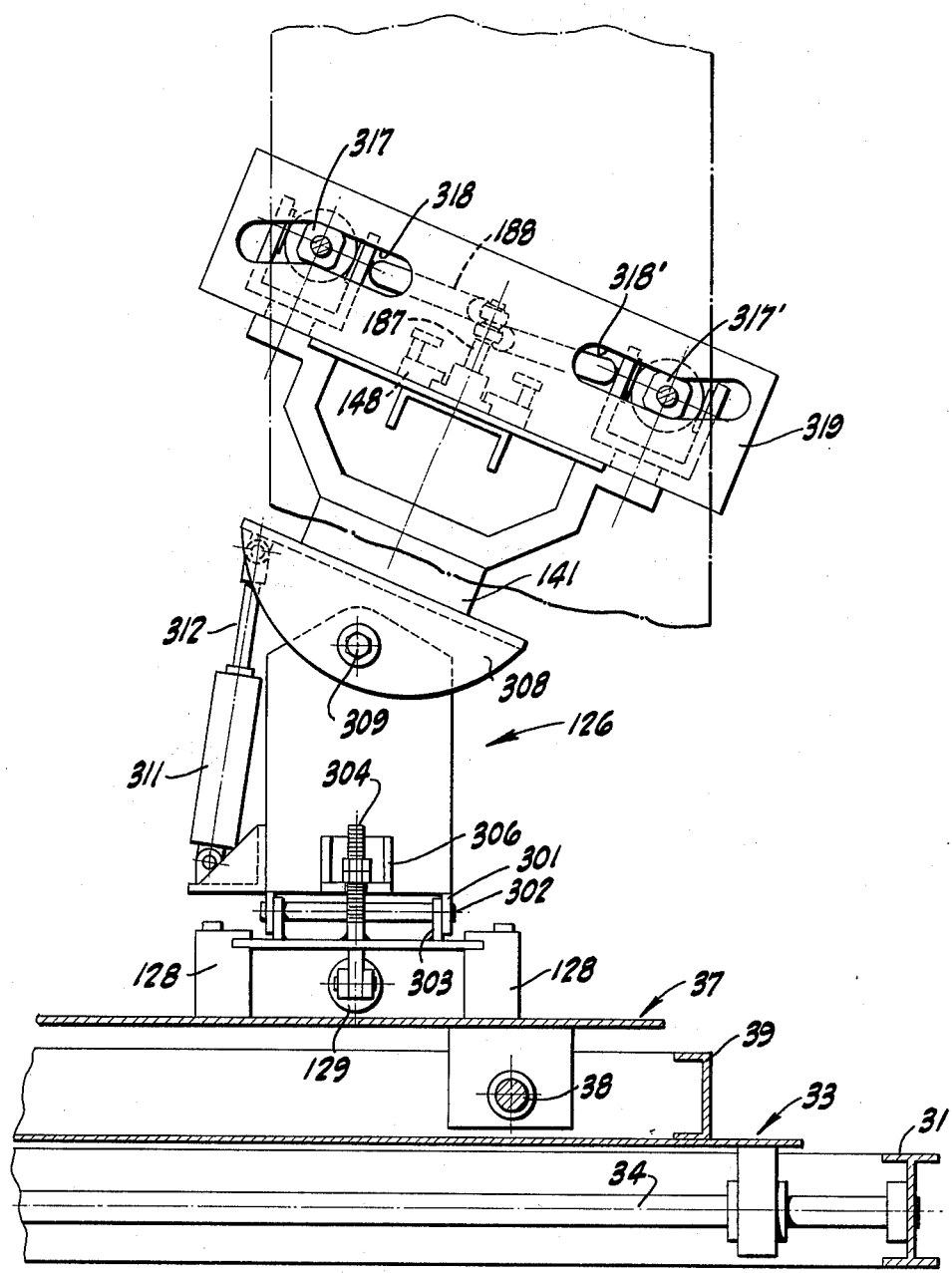
FIG. 18 is a front elevational view of the cutting means of FIG. 16 taken in the plane 18—18 thereof.

The present invention has been described above with respect to one embodiment thereof, however numerous modifications and variations are possible in the structure of the present invention while yet following the method hereof. In this respect, reference is made to FIGS. 16 to 18 illustrating an alternative embodiment of the cutting means 46 of the present invention. Although this cutting means is generally similar to that described above and illustrated in FIGS. 11 and 12, for example, alternative tilting means are provided and a somewhat different control over the cutting arms is provided. The pedestal 126 is mounted on a bottom plate 127 riding in tracks 128, and is moved by the hydraulic cylinder 129. Atop the plate 127 there is mounted a box frame 301 having an open bottom with a transverse axle 302 extending thereacross and journalled in upstanding lugs 303 on the bottom plate 127. The box frame 301 may thus be tilted forwardly and rearwardly of the tracks 128 and this is controlled by a plurality of vertically disposed bolts 304, secured as by welding on the bottom plate 127 and extending through slotted angle plates 306 on the front and rear faces of the box frame 301. Locking nuts 307 on the bolts 304 are provided above and below the extending portions of the angle plates 306 so that loosening of appropriate nuts and tightening of other nuts will adjust the angular position of the box frame 301, as it is pivoted about the axle mounting thereof.

Atop the box frame 301 there is pivotally mounted an upper frame element 308 by means of an axle or shaft 309 extending through front and rear walls of the upper element 308 and front and back faces of the box frame 301. The upper element 308 carries the beam structure 141, as previously described, and this upper element is controllably pivoted or angularly adjusted in a plane normal to the tracks 128 by means of a pneumatic or hydraulic cylinder 311, which is pivotally mounted at the bottom thereof on a bracket 313 extending laterally from the box frame 301, and which has a piston rod 312 extending from the upper end thereof into pivotal engagement with one side of the upper element 308. Actuation of the hydraulic cylinder 311 will thus be seen to provide for controlled tilting or angular adjustment of the upper element 308 laterally of the tracks 128 and thus for controlled tilting of the cutting means atop the pedestal 126.

The cutting arms 151 and 152 are mounted by gimbals 176, as previously described; however, the cutting arms differ from those previously described in the cutting knives at the forward end thereof and the manner of controlling the direction of cutting. Considering now the cutting arm 152, there will be seen to be provided an elongated bar 316 which may, for example, have a cylindrical cover over the center thereof, although this is not necessary, and which carries adjacent the forward end thereof a cam follower bar 317 which is generally rectangular in cross-section with rounded corners, and which fits in a cam opening 318 in a cam plate 319. The cam opening 318 is formed with the configuration of the cut to be made in the rubber layer 56 on the tire carcass 23. Movement of the cutter arm 152 is constrained to follow the cam opening 318, inasmuch as the cam bar 317 is rigidly mounted about the cutter arm. The cam plate 319 may be removably mounted upon a mounting plate that is carried by the cross plate 147. Various manners of removable mounting of the cam plate are possible, and different plates with different cam openings are employed for different lug cuts with the present invention.

At the forward end of the cutting arm 152 there is mounted the U-shaped or V-shaped cutting knife 166 which has a sharpened edge, and which is illustrated to be mounted on a plate 321 having a rear projection 322 that is pivotally mounted between the arms of a yoke 323 carried by the forward end of the cutting arm shaft 316. Controlled angular positioning of the knife 166 is provided by a pair of overlapping plates 324 and 326 connected on the side of the mounting plate 321 and side of the yoke 323, respectively, with curved slots being formed in each and a bolt 327 extending through these slots with one or more nuts thereon to tighten the knife mounting in desired angular relationship to the axis of the cutting arm 152.

The cutting arms 151 and 152 are moved in the same manner as described above in connection with the embodiment of FIGS. 11 and 12, and referring again to the cutting arm 152, such means includes a link 188 pivotally connected to an upward extension 187 of a slide block 149 disposed between the tracks 148 and movable therealong by an hydraulic cylinder 186. There is further provided in the present embodiment of the present invention a pair of cam tracks 328 and 329 mounted atop the tracks 148 and having particularly configured facing surfaces for control of the cutting operation.

The steps of lug cutting in this embodiment or process of the present invention is illustrated in FIG. 16 where the cutter 166 is shown in successive positions A through E. At position A the cutter is located to commence a cut. The first portion of the cut extends from position A to position B and therebetween the slide block 149 and cutting arm 152 have been moved forwardly from position I to II, and the cutting arm has been pivoted to move from location A to location B. The cutting arm is then pivoted about the point II to move the cutter between locations B and C. At position II, with the cutter at location C, the cutting arm is again moved forwardly as it continues to pivot so that the cutter traverses the path illustrated between C and D until the center of rotation of the arm is located at III. Forward movement of the cutting arm then terminates as the cut is completed. At the end of the cutting operation, the cutting arm may pivot somewhat further outward from the tire carcass, and the cutting means are retracted, with the direction of pivoting of the cutting arm then being reversed, so that the cutter is returned to position A with the center of rotation thereof returned to location I. The cutting means are then in position to make another cut after indexing of the tire. It is to be appreciated that the present invention is adapted to form indentations or cuts across the new rubber on the tire carcass in almost any desired configuration. With the embodiment of the invention illustrated in FIGS. 16 to 18, the cutting means is directed perpendicularly to the tire carcass and layer of rubber 56 thereon. Any configuration of cut which moves the cutters out of a horizontal plane through the original contact with the rubber layer 56 requires the cutters to be moved toward the rubber in order to maintain an even depth of cut. It will thus be appreciated that the locations of points B and C described above may differ for different configurations of cuts.

Considering now the means for achieving the traverse of the cutting knives as described above and referring again to FIG. 16, it will be seen that a pair of microswitches 331 and 332 are mounted one on each side of the slide block 149 for engagement with projections on the cam tracks. The facing surfaces of the cam tracks 328 and 329 have projections or cam surfaces disposed at desired locations for actuation of the switches 331 and 332 as the slide block 149 is moved along the tracks 148 by the cylinder 186. In the illustration of FIG. 16, the cutting arms are about to commence a cut, and it will be seen that the microswitch 331 is adjacent a cam projection 333 on the cam track 329. At the beginning of the cut, the switch 331 is operated by the projection 333 to energize the drive cylinder 129, and thus to move the entire cutting means forwardly toward the tire carcass as the cutting arms are pivoted outwardly at the knife ends thereof so as to form the cut illustrated by the dashed line between points A and B of FIG. 16. As the hydraulic cylinder 186 moves the slide block 149 forward in the tracks 148, the cutting arms are pivoted outwardly to form the cut as illustrated by the dashed line between the points B and C of FIG. 16. The cutting knife reaches point C as the microswitch 332 engages the elongated projection 334 on the cam track 328, so that drive cylinder 129 is again energized, and the cutting arms are thus simultaneously pivoted and moved toward the cutting surface, so that the knife follows the dashed line between points C and D of FIG. 16. It will be appreciated that the knife also travels upwardly, as dictated by the cam opening 318 in this traverse between points C and D. The slide block 149 continues to move forward so that the microswitch 332 leaves the cam surface 334 to thus de-energize the drive cylinder 129 so that forward motion of the cutting means is terminated and the cutting arm is rotated somewhat further outwardly from the tire carcass. A microswitch 336 is disposed for engagement by the cutting means at a lateral extension 337 thereof when the cutting means has moved forward to its maximum extent, and this switch 336 may be mounted for adjustable positioning as, for example, on the platform 37 so that closure of the switch initiates retraction of the cutting means under operation of the cylinder 129. In actuality, the cutting means may be retracting during movement of the cutter between points D and E of FIG. 16. At point E, movement of the slide block 149 is reversed and this is herein accomplished by provision of a microswitch 338 adjustably positioned, for example, on the cam track 329 for engagement by a lateral projection 339 on the slide block. Closure of the switch 338 operates to reverse operation of the hydraulic cylinder 186, so that the slide block is then retracted until the lateral projection 339 engages and closes a further microswitch 341, also mounted on the cam track 329. Retraction of the entire cutting means by cylinder 129 is terminated by bottom plate 127 contacting the microswitch 221.

The foregoing description of the steps of forming a cut in the layer of uncured rubber 56 on the tire carcass will be understood to be applicable to both knives of the cutting means. Also, it is noted that the description presumes formation of the cuts from the center outward. Reverse operation is also possible, wherein the cut is initiated at the outer edge of the layer 56 and terminated at the inner end of the desired cuts, merely by reversing the operation. Minor variations in initiation and termination of forward movement of the cutting means may be accomplished by relocation of the various microswitches controlling same, and major variations may be accomplished by changing the cam tracks to provide alternative cam surfaces thereon. It will, of course, be understood that variations in the cam openings 318 in the camp plate 319 may call for variations in the location of points of initiation and termination of forward movement of the cutting means. It is also to be appreciated that the entire cutting means may be tilted by the control cylinder 311, so that the plane of operation or the plane about which the cuts are made is at an angle to horizontal. This inclination of the cutting plane does not normally require any change in the control points of the cutting operation, inasmuch as cutting operations are performed symmetrically about a diameter of the tire carcass and the cutting arms with knives together lie in a plane containing such diameter.

The simplest embodiment of the present invention is a structure which is hand controlled but is yet capable of carrying out the method hereof. Reference is made to FIGS. 19 and 20 of the drawings illustrating the structure of a hand operated apparatus in accordance with the present invention and basically including a pneumatic or hydraulic cylinder 401 mounted in a frame 402 which may, in turn, be pivotally mounted from above or below, as indicated at 403. The cylinder 401 has a piston rod 404 movably extending therefrom and carrying a structure 406 upon which there is mounted an auxiliary pneumatic or hydraulic cylinder 407 which has the function of pivoting a cutter, as further described below. The piston rod 404 has a universal joint 408 included therein and at the outer end thereof pivotally mounts a U-shaped or V-shaped cutter 409.

This simplified embodiment of the present invention also includes a forward extension of the frame 402 which pivotally mounts a fence or guide 411. This fence 411 is provided for the purpose of controllably aligning the unit with a tire 412 upon which there has been applied one or more layers of uncured rubber in which a tread design is to be formed.

Provision in this embodiment is made for pivoting the cutter 409 by means of the auxiliary cylinder 407. To this end a piston rod 413 of cylinder 407 is pivotally connected to one end of a link 414, which has the other end thereof pivotally connected to the base of the cutter 409. It will be seen that operation of the auxiliary cylinder 407 to withdraw the piston rod 413 therein will pivot the cutter from a ninety degree relation to the axis of the main cylinder 401 toward a zero degree relation with such axis. This pivotable capability of the cutter is necessary in this simplified structure, as will become apparent from the following description of operation.

There is included in this simplified apparatus capable of carrying out the method or process of the present invention, means for controlling such apparatus. The control means 416 may be comprised as a pair of hand grips 417 and 418 adapted for gripping by an operator to direct and control the equipment. One of the functions which may be controlled by the control means 416 is the relative position of the guide or fence 411 and to this end there may be provided a small fence cylinder 419 pivotally mounted on the main frame 402 and having a piston rod 421 extending therefrom into pivotal engagement with the fence 411 itself. Alternatively, the fence, which is only seldom moved, may be manually adjustable with locking means for fixing the angular relation or position thereof relative to the axis of the main cylinder 401.

Considering now the operation of the above-described simple embodiment of the present invention, it is first noted that this equipment is pivotally mounted substantially in line with the axis of a tire carcass 412 that has been mounted for annular indexing and which has had one or more layers of uncured rubber applied to the periphery thereof. Assuming that the invention is to be operated to form a tread design in which tread lugs 422 are to be defined at an angle $\theta$ to the axis of the tire carcass, the fence 411 is set at an angle $90° - \theta$ to the axis of the main cylinder as by means of the fence cylinder 419. The control handles 417 and 418 incorporate control elements as by means of switch arms or depressible buttons for controlling the aforementioned and following functions.

With the frame 411 properly positioned to thus align the apparatus with the tire at a desired angle to the axis thereof, the main cylinder 401 is controllably actuated to move the cutter 409 generally laterally across the tire with the overall apparatus deflected by the operator to move the cutter through the layer of uncured rubber on the tire carcass. There is also provided means for passing an electric current through the cutter in order to heat the cutter for facilitating the cutting operation. After the cutter 409 has been moved laterally inward of the tire 412 to substantially the desired extent of the cut, the auxiliary piston 407 is operated to pivot the cutter 90° through the linkage 414 and U-joint 408 so that the cutter is moved upwardly out of the rubber to complete the cut. The tire is then rotated slightly to align the mechanism hereof with the line of the next successive cut in formation of the tire tread. The main cylinder is then operated to retract the piston rod 404 thereof mounting the cutter 409 and the auxiliary cylinder 407 is actuated to pivot the cutter back into the position illustrated in FIG. 19 in a plane that is substantially normal to the axis of the main cylinder.

The present invention is adapted (in this embodiment) to be hand operated to the extent that an operator directs the cutter in passage thereof through the rubber layer on the tire carcass. The operator is provided with means for directing and actuating the apparatus hereof as by means of the pair of control handles 417 and 418 mounted on the rear of the frame 402. There may also be provided a dual shoulder rest 426, as illustrated, for assisting the operator in directing the cutting means hereof. Preferably upon the handles of the equipment there is provided control means for the various functions described above and, referring to FIG. 19, there will be seen to be provided on the right-hand handle 417, for example, depressible buttons 427, 428 and 429 for controlling main cylinder extension, outward pivoting of the fence and cutter heating, respectively. On the left-hand handle there are provided like depressible buttons for controlling main cylinder retraction, auxiliary cylinder extension and inward pivoting of the fence, respectively. It will be appreciated that, with these exemplary controls, the cutter is only heated during depression of the control button 429 and the auxiliary cylinder is arranged to automatically extend the piston rod thereof upon release of the auxiliary cylinder extension button.

Operation of the present invention is relatively evident from the foregoing description of elements and functions thereof. An operator with the present invention can easily form tire tread at a rate that is many multiples of the rate of a skilled operator with a hand-grooving tool.

It will also be appreciated that tread grooves may be cut in accordance with the present invention by employing a device in accordance with the present invention on each side of a tire carcass having a layer of uncured rubber adhered thereabout. Two operators with equipment in accordance herewith can form a simple tread design entirely about a tire in a very short period of time. It is also noted that the present invention may be employed to cut grooves from the middle of the tire periphery laterally outward of the tire by reversing the above-described operation and controls.

The present invention has been described above in some detail as to particular preferred embodiments of apparatus suitable for carrying out the system and method hereof. It will be appreciated by those skilled in the art that many variations and modifications in the apparatus may be made and thus it is not intended to limit the present invention to the precise terms of description or details of illustration.

What is claimed is:

1. A method of retreading a buffed tire carcass comprising the steps of
    (a) mounting the tire for controlled rotation,
    (b) adhering a layer of uncured rubber about the tire periphery,
    (c) engaging the layer of rubber with a pair of cutters laterally displaced from the center of the layer on opposite sides of the center and simultaneously moving the cutters laterally of said layer and radially of the tire in cutting relation to the layer to form a pair of tread grooves in the layer and controlling the motion of said cutters by urging an extension of the cutters against a contoured surface for establishing the configuration of the tread grooves,
    (d) retracting the cutters and angularly indexing the tire,
    (e) repeating steps (c) and (d) about the tire periphery, and
    (f) vulcanizing said grooved rubber layer onto said tire carcass as new tread.

2. The method of claim 1 further defined by passing a heating current through said cutters only during engagement of cutters and layer and heating said cutters during cutting to a temperature of the order of 250° to 300° F.

3. The method of claim 1 further defined by mounting said cutters on a controllably tiltable table and tilting said table to establish a general inclined plane of tread grooves formed across said layer.

4. The method of claim 1 further defined by forming said cutter extensions with rectangular cross sections and defining said contoured surface as a cut out in a plate with said extensions movable along said cut out to tilt said cutters as they follow said contoured surface during the traverse of the cutters across the rubber layer to thus define the configuration of said tread grooves.

5. Apparatus for cutting tread grooves in a layer of uncured rubber adhered to the periphery of a tire carcass mounted for angular indexing comprising a frame having drive means for movement of said frame toward and away from the periphery of said tire carcass, a pair of substantially U-shaped cutters mounted on a pair of pivotally mounted arms on said frame for simultaneous movement laterally across separate halves of said layer on said tire carcass, a power cylinder mounted on said frame and having a piston rod linked to said cutters by linkage for pivoting said arms, means pivotally mounting said frame adjacent said mounted tire carcass, means for adjusting and setting the angular relationship of said cutter and said tire carcass, and control means for operating said power cylinder to drive said cutters along a predetermined path through said layer to form a tread groove therein and including a template having contoured surfaces against which said arms are forced for following the contour.

6. The apparatus of claim 5 further defined by said control means including cam elements, and switching elements having actuators and mounted for movement along said cam elements by said power cylinder for controllably actuating said drive means during each stroke of said power cylinder.

7. A tire retreading system comprising means rotatably mounting a tire carcass to be retreaded, extruding means for applying a layer of uncured rubber about the tire periphery and adhering the layer thereto, cutting means including a pair of controllably movable cutting arms with a cutter at the head of each arm, adjustable tilting means mounting said cutting means in pivotal relation thereon, driven plate means carrying said tilting means for moving said cutting means toward and away from the periphery of said rotably mounted tire, a pair of tread design means having predetermined contoured cam surfaces removably mounted in position for engaging said cutting arms, means engaging said cutting arms and simultaneous moving said arms over said contoured surfaces and moving said plate means for thus moving said cutters through said layer of rubber to form a pair of tread grooves of predetermined configuration, and indexing means engaging the means mounting said tire for rotating said tire through a predetermined angle after the cutting of each pair of tread grooves.

8. The system of claim 7 further defined by a movable mounting means carrying said plate means and cutting means, said extruding means being mounted alongside said plate means on said movable mounting means, and means controllably moving said mounting means axially of said mounted tire to align said extruder means or said cutting means with the periphery of the tire.

* * * * *